(12) United States Patent
Kurihara et al.

(10) Patent No.: US 11,380,325 B2
(45) Date of Patent: Jul. 5, 2022

(54) AGENT DEVICE, SYSTEM, CONTROL METHOD OF AGENT DEVICE, AND STORAGE MEDIUM

(71) Applicant: HONDA MOTOR CO., LTD., Tokyo (JP)

(72) Inventors: Masaki Kurihara, Wako (JP); Shinichi Kikuchi, Wako (JP); Shinya Yasuhara, Wako (JP); Yusuke Oi, Tokyo (JP); Hiroshi Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 16/816,325

(22) Filed: Mar. 12, 2020

(65) Prior Publication Data

US 2020/0321000 A1    Oct. 8, 2020

(30) Foreign Application Priority Data

Mar. 14, 2019   (JP) .............................. JP2019-047757

(51) Int. Cl.
| | |
|---|---|
| *G10L 15/00* | (2013.01) |
| *G10L 15/22* | (2006.01) |
| *G10L 15/08* | (2006.01) |
| *B60R 25/01* | (2013.01) |
| *B60R 25/31* | (2013.01) |
| *B60R 25/25* | (2013.01) |
| *G10L 15/24* | (2013.01) |
| *G10L 15/25* | (2013.01) |

(52) U.S. Cl.
CPC .............. *G10L 15/22* (2013.01); *B60R 25/01* (2013.01); *B60R 25/257* (2013.01); *B60R 25/31* (2013.01); *G10L 15/08* (2013.01); *G10L 15/24* (2013.01); *G10L 15/25* (2013.01); *G10L 2015/088* (2013.01); *G10L 2015/223* (2013.01); *G10L 2015/226* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 7,747,446 | B2 * | 6/2010 | Blass ...................... | G10L 15/22 704/275 |
| 8,214,219 | B2 * | 7/2012 | Prieto .................... | B60N 2/002 704/275 |
| 9,263,042 | B1 * | 2/2016 | Sharifi .................... | G06F 3/167 |
| 9,275,637 | B1 * | 3/2016 | Salvador ................ | G10L 15/06 |
| 9,418,653 | B2 * | 8/2016 | Sekiguchi ............... | G10L 15/26 |

(Continued)

FOREIGN PATENT DOCUMENTS

JP    2006-335231    12/2006

*Primary Examiner* — Richard Z Zhu
(74) *Attorney, Agent, or Firm* — Amin, Turocy & Watson, LLP

(57) ABSTRACT

An agent device includes one or more agent controllers configured to provide a service including causing an output device to output a response of voice according to a voice of an occupant which is collected in a vehicle interior of a vehicle, a receiver configured to receive an input from the occupant, and a starting method setter configured to change or add a starting method of the agent controller on the basis of content received by the receiver.

15 Claims, 19 Drawing Sheets

(56) References Cited

U.S. PATENT DOCUMENTS

| | | | |
|---|---|---|---|
| 9,747,926 B2* | 8/2017 | Sharifi | G10L 15/1815 |
| 10,083,685 B2* | 9/2018 | Zhao | G10L 15/22 |
| 10,832,662 B2* | 11/2020 | Prasad | G10L 15/08 |
| 2005/0060158 A1* | 3/2005 | Endo | G10L 15/22 |
| | | | 704/275 |
| 2015/0120300 A1* | 4/2015 | Maruta | G10L 17/22 |
| | | | 704/251 |
| 2015/0262577 A1* | 9/2015 | Nomura | G10L 15/22 |
| | | | 704/231 |
| 2018/0137264 A1* | 5/2018 | Kurian | H04L 67/12 |
| 2018/0204569 A1* | 7/2018 | Nadkar | G10L 15/22 |
| 2019/0115014 A1* | 4/2019 | Hansen | G06F 3/167 |
| 2019/0237067 A1* | 8/2019 | Friedman | G10L 15/22 |
| 2019/0258657 A1* | 8/2019 | Kubo | G06N 5/046 |
| 2019/0311715 A1* | 10/2019 | Pfeffinger | G06F 3/167 |
| 2020/0381004 A1* | 12/2020 | Truong | G06F 16/53 |

* cited by examiner

| SPECIFIC WORD |
| --- |
| HONDA |
| ICHIRO |
| MOTO CHAN |
| MOTO KUN |
| ⋮ |

| IDENTIFICATION INFORMATION OF FEATURE AMOUNT | WAKE-UP WORD |
|---|---|
| 001 | AAA |
| 002 | BBB |
| ⋮ | ⋮ |

| IDENTIFICATION INFORMATION OF FEATURE AMOUNT | WAKE-UP WORD |
|---|---|
| - | CCC |
| - | DDD |
| ⋮ | ⋮ |

AGENT DEVICE, SYSTEM, CONTROL METHOD OF AGENT DEVICE, AND STORAGE MEDIUM

CROSS-REFERENCE TO RELATED APPLICATION

Priority is claimed on Japanese Patent Application No. 2019-047757, filed Mar. 14, 2019, the content of which is incorporated herein by reference.

BACKGROUND

Field

The present invention relates to an agent device, a system, a control method of the agent device, and a storage medium.

Description of Related Art

Conventionally, a technology related to an agent function of providing information on driving support in accordance with a request of an occupant, control of a vehicle, and other applications while conducting a conversation with the occupant of the vehicle has been disclosed (Japanese Unexamined Patent Application, First Publication No. 2006-335231).

In recent years, practical application of mounting an agent function in a vehicle has been advanced, but a starting method of the agent function has not been sufficiently considered. For this reason, in the conventional technology, a starting method matching a preference of a user may not be provided in some cases.

SUMMARY

The present invention has been made in view of such circumstances, and an object thereof is to provide an agent device, a system, a control method of the agent device, and a storage medium that provide a starting method matching a preference of a user.

The agent device, system, control method of an agent device, and storage medium according to the present invention have adopted the following configuration.

(1): An agent device according to one aspect of the present invention is an agent device that includes one or more agent controllers configured to provide a service including causing an output device to output a response of voice according to a voice of an occupant which is collected in a vehicle interior of a vehicle, a receiver configured to receive an input from the occupant, and a starting method setter configured to change or add a starting method of the agent controller on the basis of content received by the receiver.

(2): In the aspect of (1) described above, the agent controller is started in accordance with a starting keyword that is included in the voice and is based on a starting method set by the starting method setter.

(3): In the aspect of (2) described above, the starting method setter excludes a specific word stored in a storage from the starting keyword.

(4): In the aspect of (3) described above, the specific word includes a part or all of a name, a surname, a full name, a nickname, and a common name of a person related to the occupant of the vehicle, which are stored in the storage.

(5): In the aspect of (3) or (4) described above, the agent device causes the storage to store a part or all of the name, surname, full name, nickname, and common name of a person related to the occupant of the vehicle as the specific word.

(6): In the aspect of any one of (2) to (5) described above, when it is estimated that the set starting keyword is a word indicating a male, the agent controller provides a service including causing the output device to output the voice response on the basis of a result of the estimation.

(7): In the aspect of (6) described above, the agent controller provides the voice response using a male tone or accent on the basis of the result of the estimation.

(8): In the aspect of any one of (2) to (7) described above, when it is estimated that the set starting keyword is a word indicating a female, the agent controller provides a service including causing the output device to output the voice response on the basis of a result of the estimation.

(9): In the aspect of (8) described above, the agent controller provides the voice response using a female tone or accent on the basis of the result of the estimation.

(10): In the aspect of any one of (2) to (9) described above, the agent device further includes an occupant detector configured to detect an occupant of the vehicle, in which the agent controller is not started in accordance with a first starting keyword when it is determined that the first starting keyword is input by an occupant different from a first occupant who has set the first starting keyword as a starting keyword via the receiver on the basis of a result of the detection of the occupant detector, and starts in accordance with the first starting keyword when it is determined that the first starting keyword is input by the first occupant via the receiver on the basis of the result of the detection of the occupant detector.

(11): In the aspect of any one of (2) to (10) described above, the agent device further includes an occupant detector configured to detect an occupant of the vehicle, in which the agent controller is not started in accordance with a first starting keyword when the first starting keyword is input, and it is determined that an occupant other than a first occupant associated with the first starting keyword is present in a vehicle interior of the vehicle on the basis of a result of the detection of the occupant detector, and starts in accordance with the first starting keyword when the first starting keyword is input, and it is determined that an occupant other than the first occupant associated with the first starting keyword is not present in the vehicle interior of the vehicle on the basis of the result of the detection of the occupant detector.

(12): In the aspect of (10) or (11) described above, the agent controller does not refer to an operation history when the agent controller has started with a starting keyword different from the first starting keyword, wherein the operation history is operation history in which the agent controller referred when the agent controller has started with the first starting keyword.

(13): A system including the agent device according to the aspect of any one of (2) to (12) described above includes a plurality of agent controllers, in which the starting method setter uses a starting keyword common to the plurality of agent controllers.

(14): A control method of an agent device according to another aspect of the present invention is a control method of an agent device including, by a computer, providing a service which includes causing an output device to output a voice response according to a voice of an occupant which is collected in a vehicle interior of a vehicle, receiving an input by the occupant, and changing or adding a starting method of a function of providing the service on the basis of the received content.

(15): A storage medium according to still another aspect of the present invention is a non-transitory computer-readable storage medium that stores a computer program to be executed by a computer to perform at least: provide a service which includes causing an output device to output a voice response according to a voice of an occupant which is collected in a vehicle interior of a vehicle, receive an input by the occupant, and change or add a starting method of a function of providing the service on the basis of the received content.

According to (1), (2), and (13) to (15), it is possible to provide a starting method matching a preference of a user by changing or adding a starting method of an agent controller.

According to (3) to (5), since a specific word stored in a storage is excluded from a starting keyword when an occupant has used the specific word in daily conversation without intention to cause an agent controller to start, the agent controller is curbed from starting, and thus convenience for the occupant can be improved.

According to (6) to (9), a satisfaction level of an occupant can be improved by providing a service that includes causing an output device to output a voice response on the basis of a type of the occupant.

According to (10) to (12), since an agent controller starts in consideration of a result of detection by an occupant detector, privacy of an occupant can be protected.

BRIEF DESCRIPTION OF THE DRAWINGS

FIG. 8 is a diagram which shows an example of content of a specific word dictionary.

FIG. 15 is a diagram which shows an example of content of wake-up word information.

DESCRIPTION OF EMBODIMENTS

Hereinafter, embodiments of an agent device, a system, a control method of the agent device, and a storage medium of the present invention will be described with reference to the drawings.

First Embodiment

An agent device is a device that realizes part or all of an agent system. In the following description, as an example of an agent device, an agent device which is mounted in a vehicle (hereinafter, a vehicle M) and includes a plurality of types of agent functions will be described. The agent functions include, for example, a function of providing various types of information based on a request (command) included in a speech of an occupant of the vehicle M or mediating a network service while conversing with the occupant. A plurality types of agents each may have different functions, processing procedures, controls, output modes, and contents. The agent functions may also include functions of controlling devices (for example, devices related to driving control and vehicle body control) in the vehicle, and the like.

The agent functions are realized by, for example, integrally using, in addition to a voice recognition function of recognizing a voice of the occupant (a function of converting the voice into text), a natural language processing function (a function of understanding a structure and meaning of a text), a conversation management function, a network searching function of searching for other devices via a network or searching for a predetermined database held by a host device, and the like. Some or all of these functions may be realized by an artificial intelligence (AI) technology. Some of constituents for performing these functions (particularly, a voice recognition function and a natural language processing interpretation function) may be mounted on an agent server (external device) which can communicate with an in-vehicle communication device of the vehicle M or a general-purpose communication device brought into the vehicle M. In the following description, it is a premise that some of the constituents are mounted on the agent server, and the agent device and the agent server cooperate to realize the agent system. A service providing entity (service/entity) that is caused to virtually appear by the cooperation of the agent device and the agent server is referred to as an agent.

<Overall Configuration>

Figure 1:
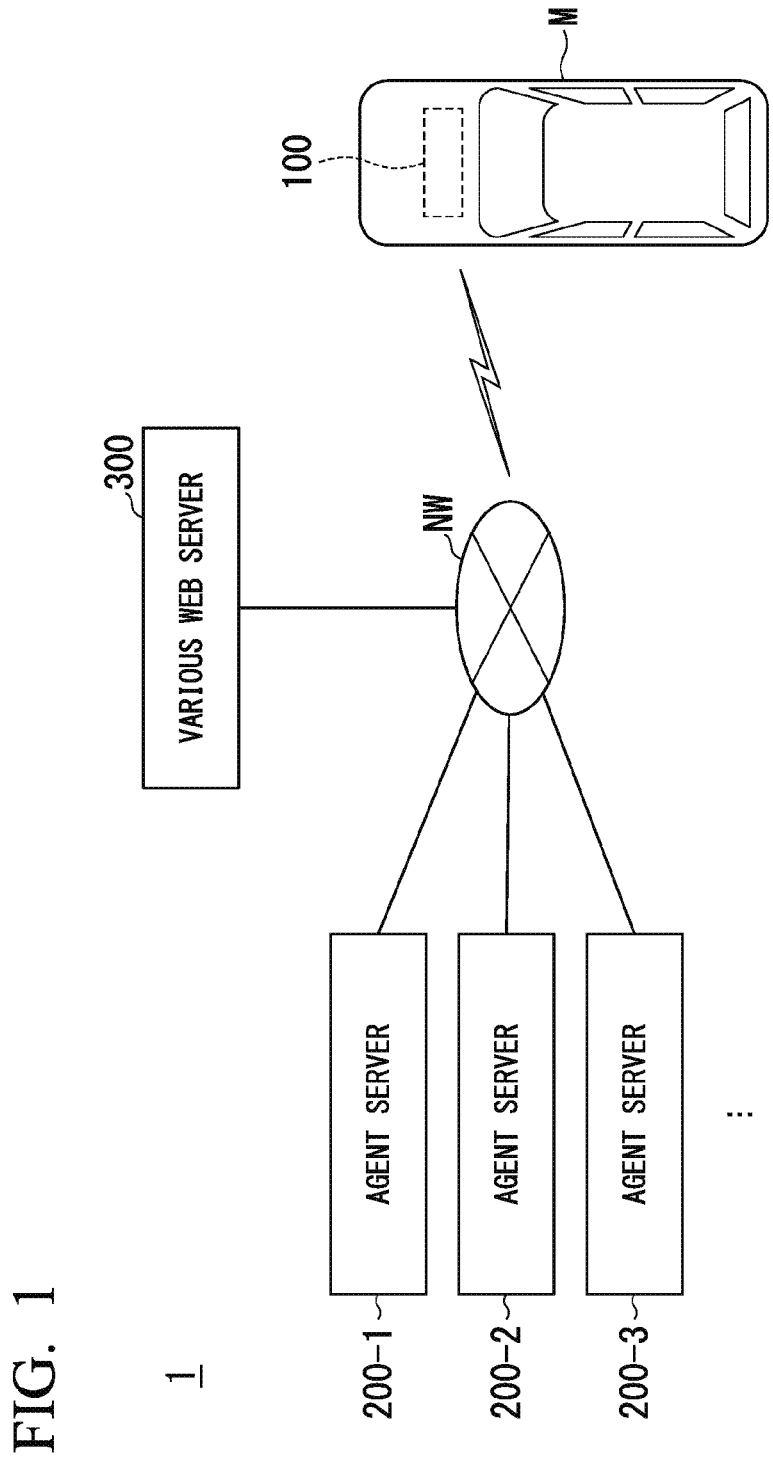
FIG. 1 is a configuration diagram of an agent system including an agent device.

FIG. 1 is a configuration diagram of an agent system 1 including an agent device 100. The agent system 1 includes, for example, the agent device 100, a plurality of agent servers 200-1, 200-2, 200-3, . . . , and so forth. Numbers following hyphens at the ends of codes are assumed to be identifiers for distinguishing the agents. When it is not necessary to distinguish between the agent servers, they may be simply referred to as an agent server 200. Although three agent servers 200 are shown in FIG. 1, the number of agent servers 200 may be two or may be four or more. The agent servers 200 are each operated by providers of different agent systems. Therefore, the agents in the present invention are agents realized by different providers. Examples of the providers include, for example, an automobile manufacturer, an e-commerce provider, a mobile terminal seller, and the like, and an arbitrary entity (a corporation, an organization, an individual, or the like) can be a provider of the agent system.

The agent device 100 communicates with the agent server 200 via a network NW. The network NW includes, for example, some or all of the Internet, a cellular network, a Wi-Fi network, a wide area network (WAN), a local area network (LAN), a public line, a telephone line, a wireless base station, and the like. Various types of web servers 300 are connected to the network NW, and the agent server 200 or the agent device 100 can acquire a web page from various types of web servers 300 via the network NW.

The agent device 100 converses with the occupant of the vehicle M, transmits a voice from the occupant to the agent server 200, and presents a response obtained from the agent server 200 to the occupant in a form of voice output or image display.

First Embodiment

[Vehicle]

Figure 2:
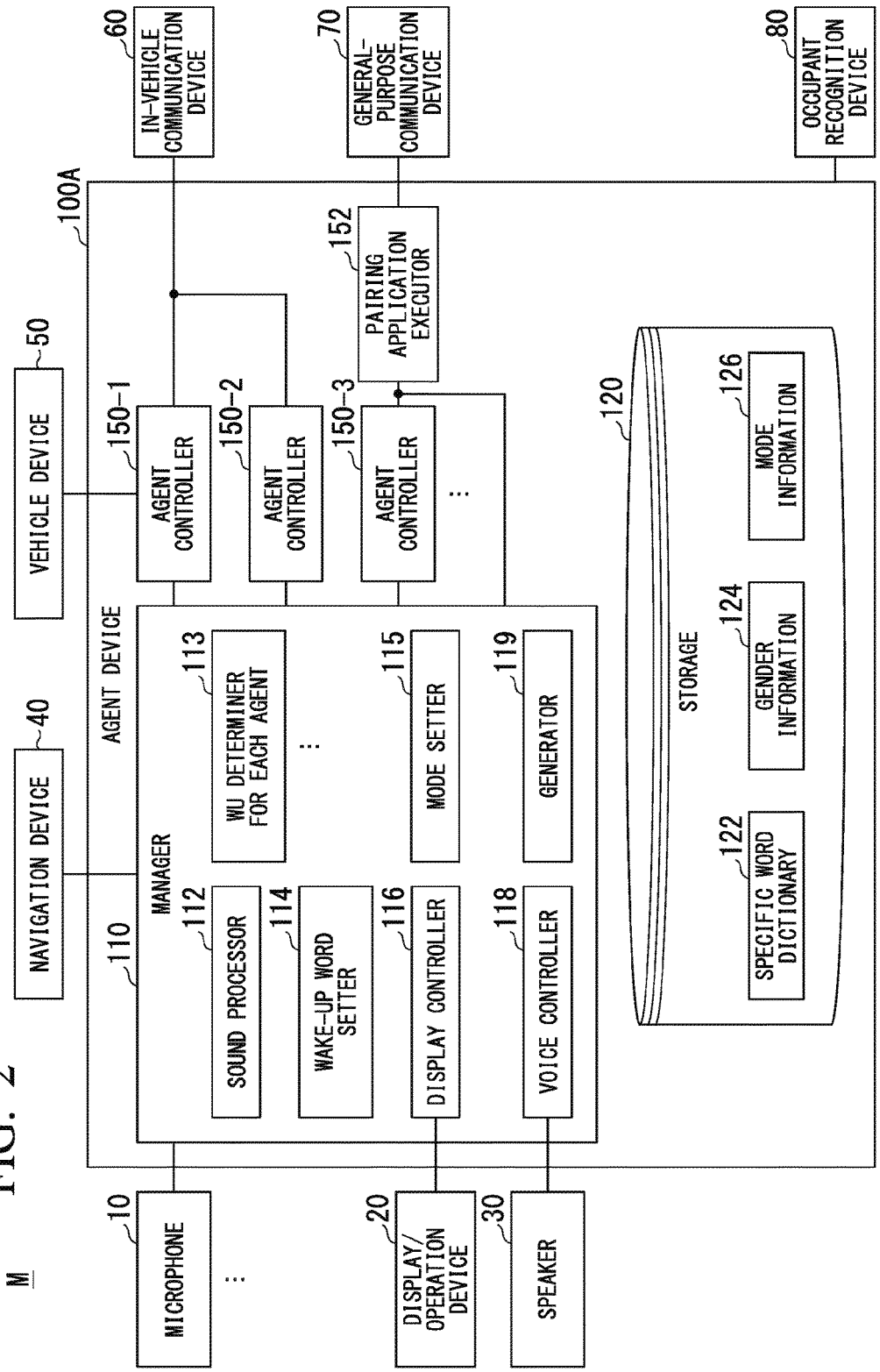
FIG. 2 is a diagram which shows a configuration of an agent device according to a first embodiment and devices mounted in a vehicle.

FIG. 2 is a diagram which shows a configuration of the agent device 100 according to the first embodiment and devices mounted in the vehicle M. For example, one or more microphones 10, a display/operation device 20, a speaker 30, a navigation device 40, a vehicle device 50, an in-vehicle communication device 60, an occupant recognition device 80, and an agent device 100 are mounted on the vehicle M. A general-purpose communication device 70 such as a smartphone may be brought into a vehicle and may be used as a communication device in some cases. These devices are connected to each other by a multiplex communication line such as a controller area network (CAN) communication line, a serial communication line, a wireless communication network, or the like. The constituents shown in FIG. 2 are merely an example, and some of the constituents may be omitted or another constituent may also be added.

The microphone 10 is a sound collector which collects voices emitted in a vehicle interior. The display/operation device 20 is a device (or a device group) that displays an image and is capable of receiving an input operation. The display/operation device 20 includes, for example, a display device configured as a touch panel. The display/operation device 20 may further include a head up display (HUD) or a mechanical input device. The speaker 30 includes, for example, a plurality of speakers (sound output devices) arranged at different positions in the vehicle interior. The display/operation device 20 may be shared by the agent device 100 and the navigation device 40. Details of these will be described below.

The navigation device 40 includes, a navigation human machine interface (HMI), a position measuring device such as a global positioning system (GPS), a storage device storing map information, and a control device (navigation controller) performing route searching and the like. Some or all of the microphone 10, the display/operation device 20, and the speaker 30 may be used as the navigation HMI. The navigation device 40 searches for a route (navigation route) for moving from a position of the vehicle M identified by the position measuring device to a destination input by the occupant, and outputs guidance information using the navigation HMI such that the vehicle M can travel along the route. A route searching function may be provided in a navigation server that can be accessed via the network NW. In this case, the navigation device 40 acquires a route from the navigation server and outputs guidance information. The agent device 100 may be constructed based on a navigation controller, and, in this case, the navigation controller and the agent device 100 are integrally configured on hardware.

The vehicle device 50 includes, for example, a drive force output device such as an engine or a traveling motor, a starting motor of an engine, a door lock device, a door opening/closing device, a window, a window opening/closing device, a window opening/closing control device, a seat, a seat position control device, a windshield rearview mirror and its angular position control device, a lighting device inside and outside the vehicle and its control device, a wiper and a defogger and their respective control devices, a direction indicator and its control device, an air conditioner, a vehicle information device of information on mileage, a tire pressure, information on a remaining fuel amount, and the like.

The in-vehicle communication device 60 is, for example, a wireless communication device which can access the network NW using a cellular network or Wi-Fi network.

The occupant recognition device 80 includes, for example, a seating sensor, a camera in the vehicle interior, an image recognition device, and the like. The seating sensor includes a pressure sensor provided below a seat, a tension sensor attached to a seat belt, and the like. The camera in the vehicle interior is a charge coupled device (CCD) camera or a complementary metal oxide semiconductor (CMOS) camera provided in the vehicle interior. The image recognition device analyzes an image of the camera in the vehicle interior and recognizes the presence or absence of an occupant for each seat, a face direction, and the like. In the present embodiment, the occupant recognition device 80 is an example of a seating position recognizer.

Figure 3:
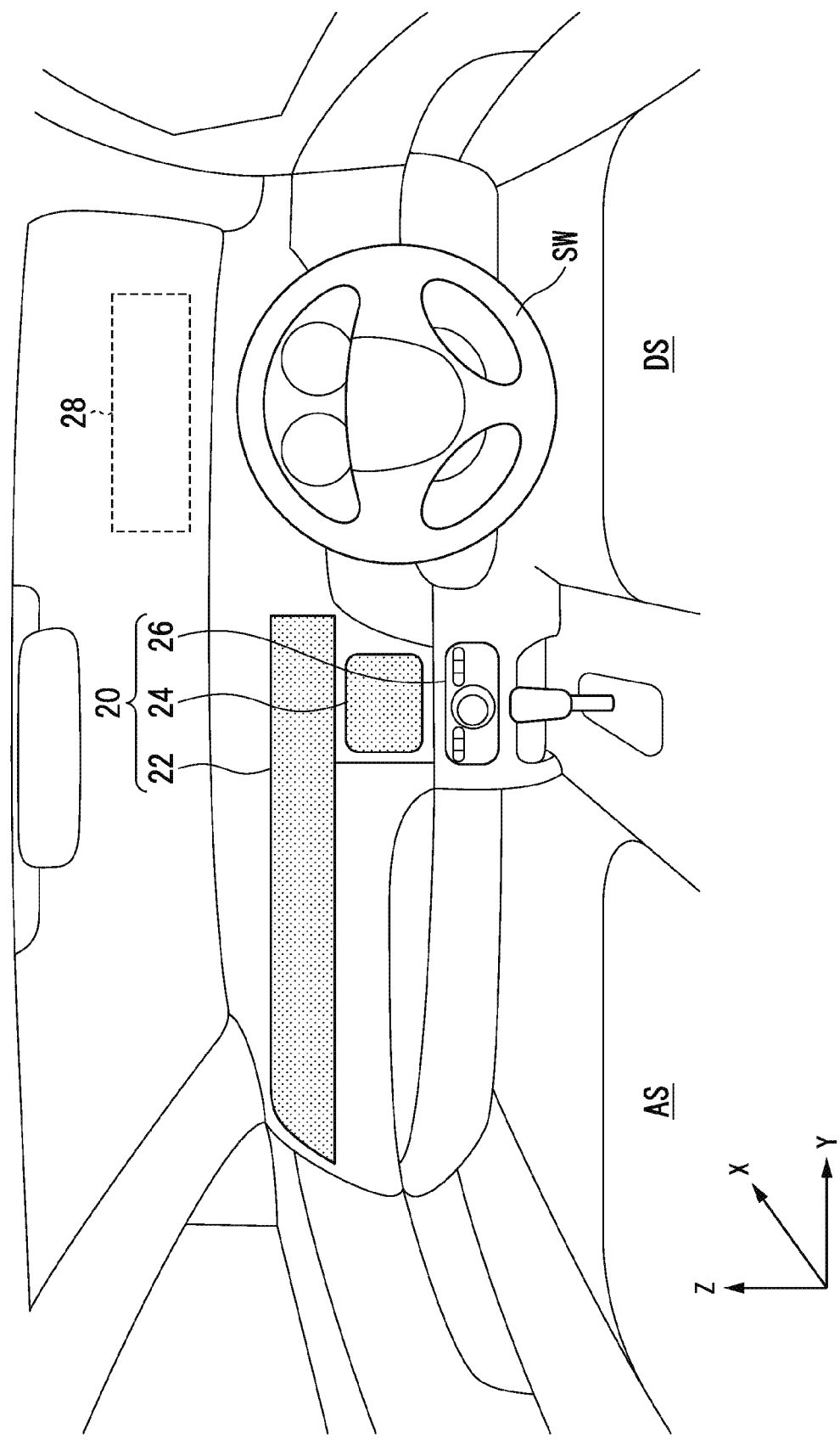
FIG. 3 is a diagram which shows an arrangement example of a display/operation device.

FIG. 3 is a diagram which shows an arrangement example of the display/operation device 20. The display/operation device 20 includes, for example, a first display 22, a second display 24, and an operation switch ASSY26. The display/operation device 20 may further include a HUD 28.

The vehicle M includes, for example, a driver seat DS provided with a steering wheel SW and a passenger seat AS provided in a vehicle width direction (Y direction in FIG. 3) with respect to the driver seat DS. The first display 22 is a display device in a horizontally long shape that extends to a position facing a left end of the passenger seat AS from a middle between the driver seat DS and the passenger seat AS in an instrument panel. The second display 24 is installed at a middle between the driver seat DS and the passenger seat AS in the vehicle width direction and below the first display 22. For example, both the first display 22 and the second display 24 are configured as touch panels, and include a liquid crystal display (LCD), an organic electroluminescence (EL), a plasma display, or the like as a display. The operation switch ASSY26 is an integration of a dial switch, a button switch, and the like. The display/operation device 20 outputs content of an operation performed by the occupant to the agent device 100. The content displayed on the first display 22 or the second display 24 may be determined by the agent device 100.

Figure 4:
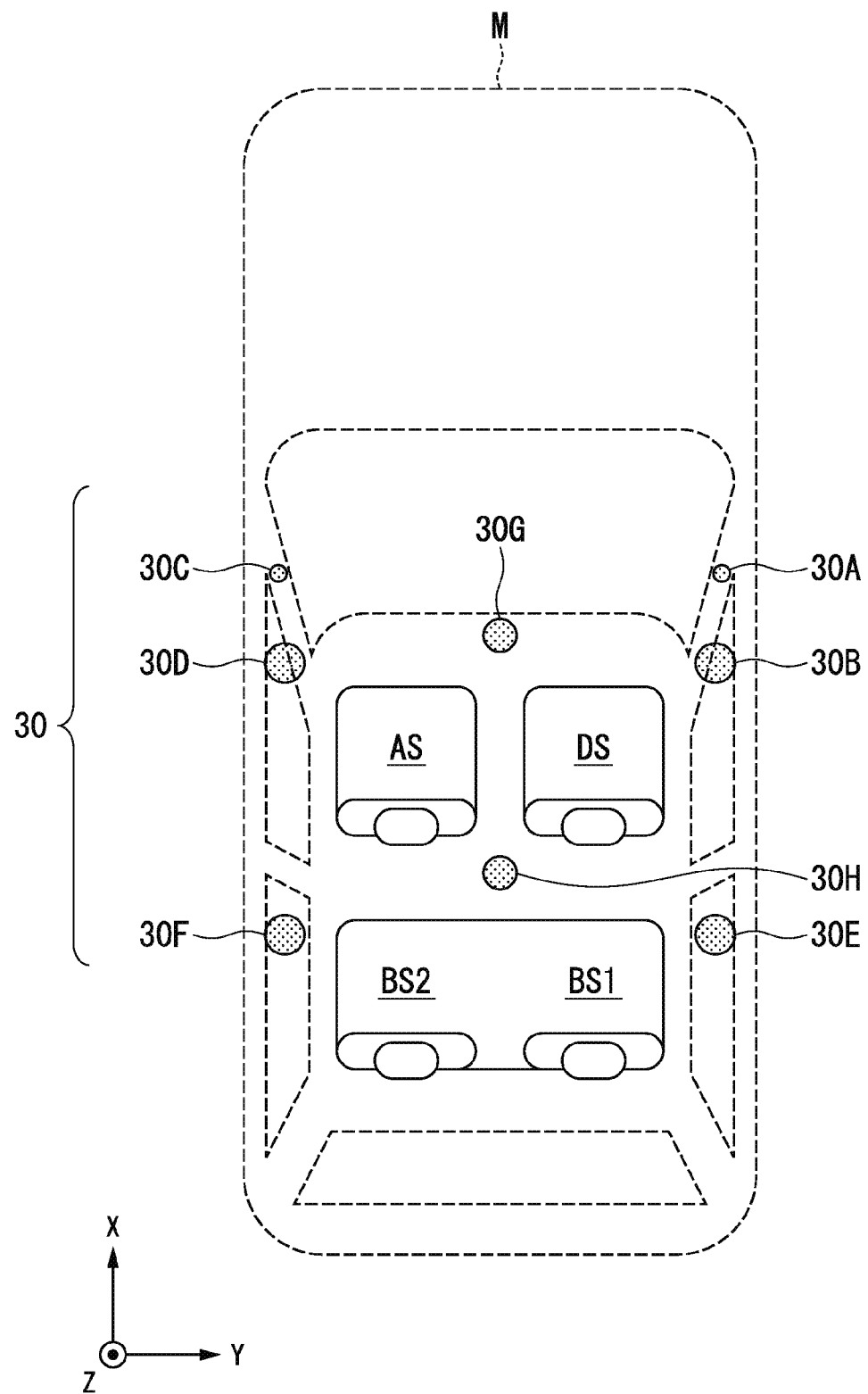
FIG. 4 is a diagram which shows an arrangement example of a speaker.

FIG. 4 is a diagram which shows a disposition example of the speaker 30. The speaker 30 includes, for example, speakers 30A to 30H. A speaker 30A is installed on a window pillar (a so-called A pillar) on the driver seat DS side. A speaker 30B is installed below a door near the driver seat DS. A speaker 30C is installed on a window pillar on the passenger seat AS side. A speaker 30D is installed below a door near the passenger seat AS. A speaker 30E is installed below a door near a right rear seat BS1 side. A speaker 30F is installed below a door near a left rear seat BS2 side. A speaker 30G is installed in a vicinity of the second display 24. A speaker 30H is installed on a ceiling (roof) of the vehicle interior.

In this arrangement, for example, when the speakers 30A and 30B are caused to exclusively output sounds, a sound image will be localized near the driver seat DS. When the speakers 30C and 30D are caused to exclusively output sounds, a sound image will be localized near the passenger seat AS. When the speaker 30E is caused to exclusively output sounds, a sound image will be localized near the right rear seat BS1. When the speaker 30F is caused to exclusively output sounds, a sound image will be localized near the left rear seat BS2. When the speaker 30G is caused to exclusively output sounds, a sound image will be localized near the front of the vehicle interior, and, when the speaker 30H is caused to exclusively output sounds, a sound image will be localized near a top of the vehicle interior. This present invention is not limited thereto, and the speaker 30 can cause a sound image to be localized at an arbitrary position in the vehicle interior by adjusting a distribution of sounds output from each speaker using a mixer or an amplifier.

[Agent Device]

Returning to FIG. 2, the agent device 100 includes a manager 110, a storage 120, agent controllers 150-1, 150-2, and 150-3, and a pairing application executor 152. The manager 110 includes, for example, a sound processor 112, a wake up (WU) determiner for each agent 113, a wake-up word setter 114, a mode setter 115, a display controller 116, a voice controller 118, and a generator 119. When there is no distinction between the agent controllers, they are simply referred to as agent controllers 150. Three agent controllers 150 shown are merely an example associated with the number of agent servers 200 in FIG. 1, and the number of the agent controllers 150 may be two, four, or more. The software arrangement shown in FIG. 2 is simply shown for description, and, in practice, for example, the manager 110 may be interposed between the agent controller 150 and an in-vehicle communication device 60, or can be arbitrarily modified.

Each component of the agent device 100 is realized by, for example, a hardware processor such as a central processing unit (CPU) executing a program (software). Part or all of these components may also be realized by hardware such as large scale integration (LSI), an application specific integrated circuit (ASIC), a field-programmable gate array (FPGA), and a graphics processing unit (GPU), or may be realized by cooperation of software and hardware. The program may be stored in a storage device such as a hard disk drive (HDD) or a flash memory in advance, and may be stored in a detachable storage medium (non-transitory storage medium) such as a DVD or a CD-ROM and installed by attaching the storage medium to a drive device.

The storage 120 stores a specific word dictionary 122, gender information 124, mode information 126, and the like. The specific word dictionary 122 and the gender information 124 stored in the storage 120 described above may also be provided for each agent controller 150.

The manager 110 functions by executing a program such as an operating system (OS) or middleware.

The sound processor 112 of the manager 110 performs sound processing on an input sound to be suitable for recognizing a wake-up word set in advance for each agent. The sound processor 112 is an example of a "receiver" that receives an input of a sound generated by the occupant.

The WU determiner for each agent 113 is present associated with each of the agent controllers 150-1, 150-2, and 150-3, and recognizes a wake-up word determined for each agent in advance. The WU determiner for each agent 113 recognizes a meaning of voice from a voice (voice stream) on which sound processing has been performed. First, the WU determiner for each agent 113 detects a voice section on the basis of an amplitude and zero crossing of a voice waveform in the voice stream. The WU determiner for each agent 113 may perform section detection based on voice identification and non-voice identification on a frame basis based on a Gaussian mixture model (GMM).

Next, the WU determiner for each agent 113 converts a voice in the detected voice section into text and sets it as text information. Then, the WU determiner for each agent 113 determines whether the text information converted into text corresponds to (associates with) a wake-up word. When it is determined that the text information is a wake-up word, the WU determiner for each agent 113 causes a corresponding (associated) agent controller 150 to start. A function associated with the WU determiner for each agent 113 may be mounted on the agent server 200. In this case, when the manager 110 transmits a voice stream on which sound processing has been performed by the sound processor 112 to the agent server 200 and the agent server 200 determines that it is a wake-up word, the agent controller 150 starts according to an instruction from the agent server 200. Each agent controller 150 always starts and may perform determination of a wake-up word by itself. In this case, the manager 110 does not need to include the WU determiner for each agent 113.

The wake-up word setter 114 changes or adds a starting method of some or all of the plurality of agent controllers 150 on the basis of content received by the sound processor 112.

The mode setter 115 changes or adds a starting method of the agent controller 150 on the basis of the content received by the sound processor 112. The details will be described below.

The agent controller 150 provides a service that includes causing an agent to appear in cooperation with a corresponding (associated) agent server 200 and causing an output device to output a voice response according to an utterance of the occupant of the vehicle (a voice of the occupant which is collected in the vehicle interior of the vehicle). The agent controller 150 may include part to which authority to control the vehicle device 50 is given. The agent controller 150 may communicate with the agent server 200 in cooperation with the general-purpose communication device 70 via a pairing application executor 152. For example, the authority to control the vehicle device 50 is given to an agent controller 150-1. The agent controller 150-1 communicates with an agent server 200-1 via the in-vehicle communication device 60. An agent controller 150-2 communicates with an agent server 200-2 via the in-vehicle communication device 60. An agent controller 150-3 communicates with an agent server 200-3 in cooperation with the general-purpose communication device 70 via the pairing application executor 152.

The pairing application executor 152 performs pairing with the general-purpose communication device 70 by, for example, Bluetooth (registered trademark), and performs connection between the agent controller 150-3 and the general-purpose communication device 70. The agent controller 150-3 may be connected to the general-purpose communication device 70 by wired communication using a universal serial bus (USB) or the like.

The display controller 116 causes the first display 22 or the second display 24 to display an image in accordance with an instruction from the agent controller 150. In the following description, it is assumed that the first display 22 is used. The display controller 116 generates, for example, an image (hereinafter, referred to as an agent image) of an anthropomorphized agent who communicates with the occupant in the vehicle interior and causes the first display 22 to display the generated agent image under control of part of the agent controller 150. The agent image is, for example, an image in a mode of speaking to the occupant. The agent image may include, for example, at least a face image in which an expression and a face direction are recognized by a viewer (occupant). For example, in the agent image, parts imitating eyes and nose are represented in a face area, and the expression and the face direction may be recognized on the basis of positions of the parts in the face area. The agent image is an image that is three-dimensionally perceived by a viewer, and in which the face direction of an agent is recognized by including a head image in a three-dimensional space. The agent image may include an image of a main body (torso and limbs) in which an operation, a behavior, a posture, and the like of an agent are recognized. The agent image may be an animation image.

The voice controller 118 causes part or all of speakers included in the speaker 30 to output voice in accordance with an instruction from the agent controller 150. The voice controller 118 may perform control to cause a sound image of the agent voice to be localized at a position associated with a display position of the agent image using a plurality of speakers 30. The position associated with a display position of the agent image is, for example, a position at which the occupant is expected to perceive as if the agent image is speaking the agent voice, and is specifically a position near (for example, within 2 to 3 [cm]) the display position of the agent image. Localization of the sound image is, for example, that a spatial position of a sound source perceived by the occupant is determined by adjusting a volume of sound transmitted to left and right ears of the occupant.

Figure 5:
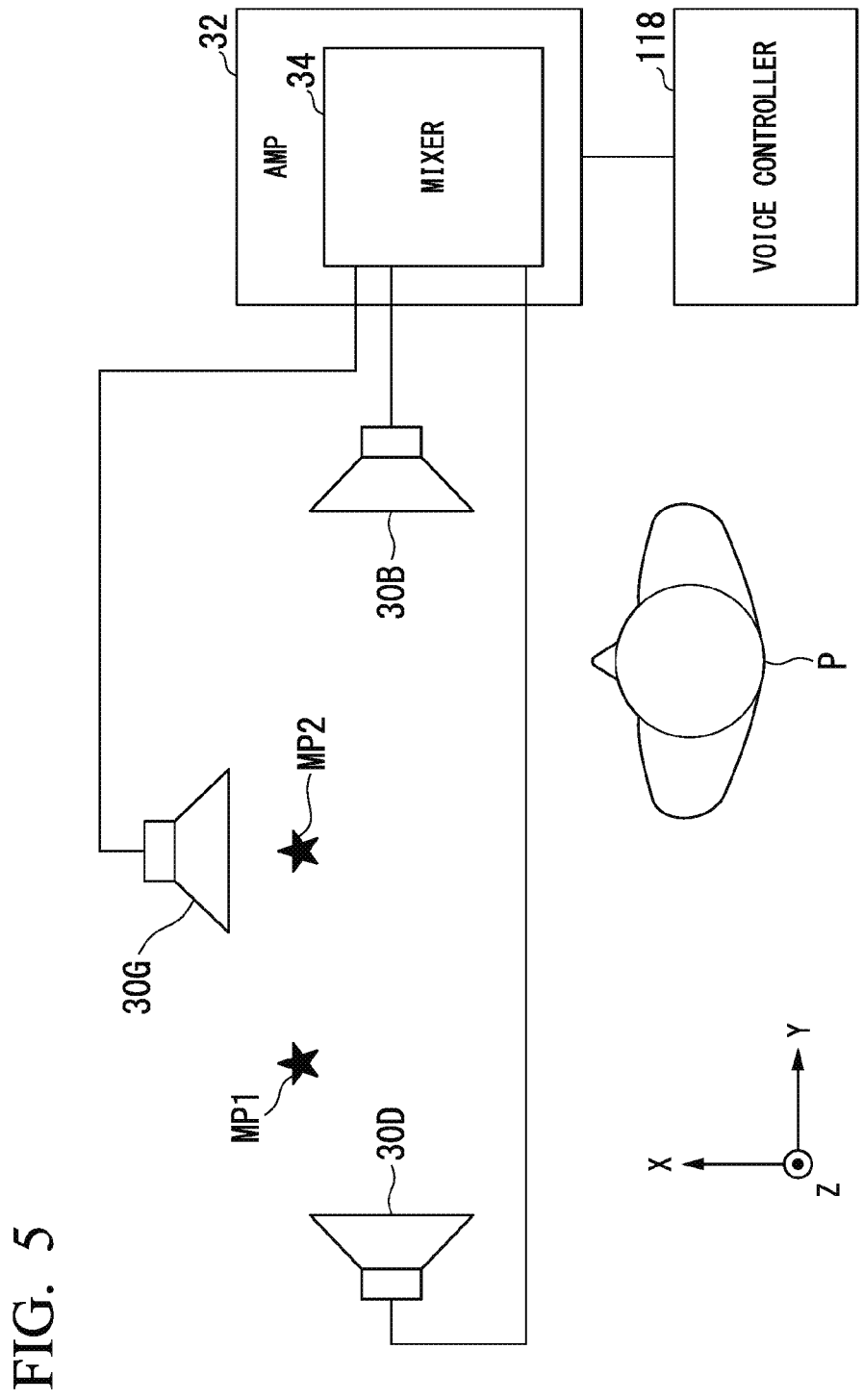
FIG. 5 is a diagram for describing a principle of determining a position at which a sound image is localized.

FIG. 5 is a diagram for describing a principle of determining a position at which the sound image is localized. FIG. 5 shows an example using the speakers 30B, 30D, and 30G described above for simplification of the description, but an arbitrary speaker included in the speaker 30 may be used. The voice controller 118 controls an amplifier (AMP) 32 and a mixer 34 connected to each speaker, and causes the sound image to be localized. For example, when the sound image is localized at a spatial position MP1 shown in FIG. 5, the voice controller 118 causes the speaker 30B to perform an output with 5% of the maximum intensity, causes the speaker 30D to perform an output with 80% of the maximum intensity, and causes the speaker 30G to perform an output with 15% of the maximum intensity by controlling the amplifier 32 and the mixer 34. As a result, it is perceived that the sound image is localized at the spatial position MP1 shown in FIG. 5 from a position of the occupant P.

When the sound image is localized at a spatial position MP2 shown in FIG. 5, the voice controller 118 causes the speaker 30B to perform an output with 45% of the maximum intensity, causes the speaker 30D to perform an output with 45% of the maximum intensity, and causes the speaker 30G to perform an output with 45% of the maximum intensity by controlling the amplifier 32 and the mixer 34. As a result, it is perceived that the sound image is localized at the spatial position MP2 shown in FIG. 5 from the position of the occupant P. As described above, the position at which the sound image is localized can be changed by adjusting the plurality of speakers provided in the vehicle interior and a magnitude of sound output from each speaker. More specifically, since the position at which the sound image is localized is determined on the basis of sound characteristics originally held by the sound source, information on environment in the vehicle interior, and a head-related transfer function (HRTF). The voice controller 118 causes the sound image to be localized at a predetermined position by controlling the speaker 30 with an optimal output distribution obtained in advance by sensory tests and the like.

The generator 119 generates a specific word dictionary 122 on the basis of a specific word or a word similar to the specific word. The details will be described below.

[Agent Server]

Figure 6:
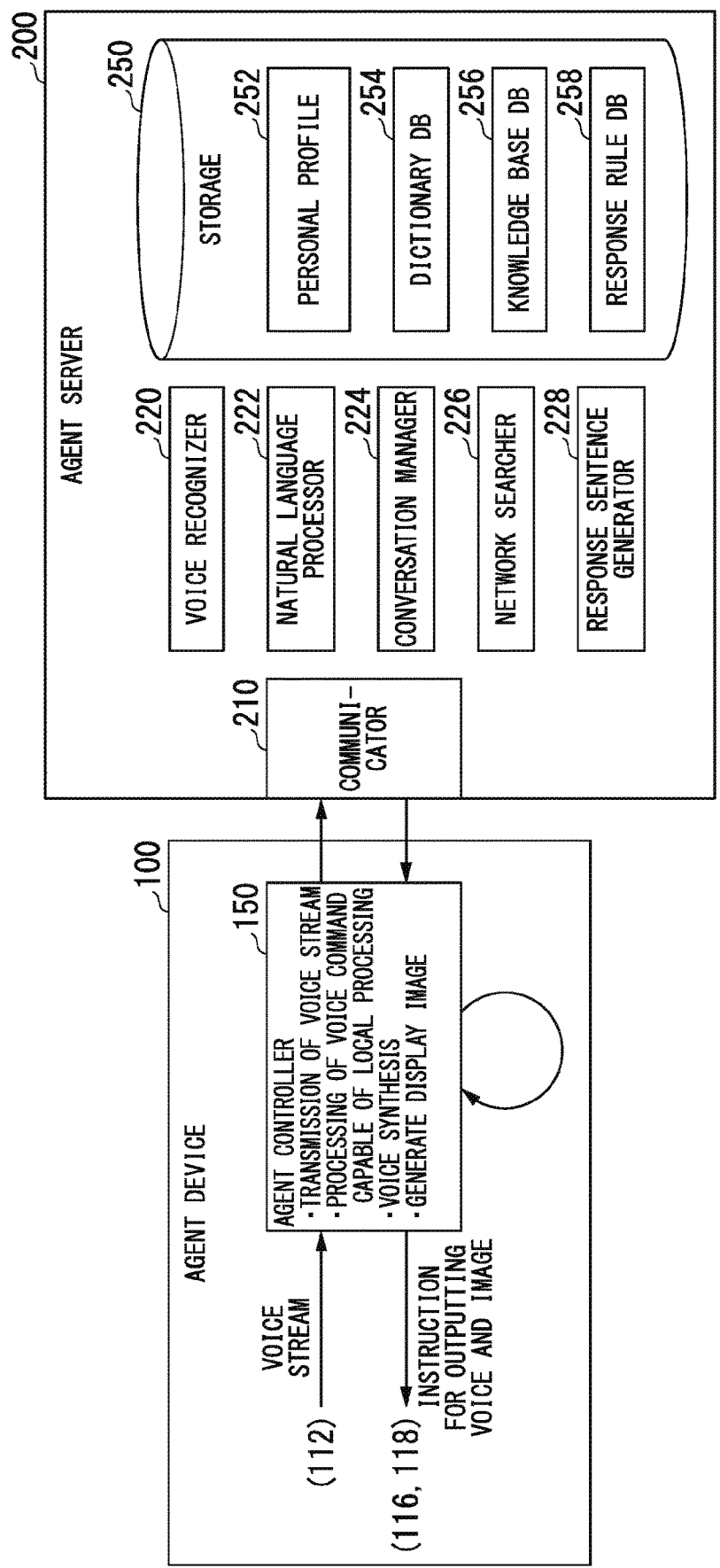
FIG. 6 is a diagram which shows a configuration of an agent server and a part of a configuration of the agent device.

FIG. 6 is a diagram which shows a configuration of the agent server 200 and part of a configuration of the agent device 100. In the following description, an operation of the agent controller 150 and the like will be described together with the configuration of the agent server 200. Here, description of physical communication from the agent device 100 to the network NW will be omitted.

The agent server 200 includes a communicator 210. The communicator 210 is, for example, a network interface such as a network interface card (NIC). Furthermore, the agent server 200 includes, for example, a voice recognizer 220, a natural language processor 222, a conversation manager 224, a network searcher 226, and a response sentence generator 228. These components are realized by, for example, a hardware processor such as a CPU executing a program (software). Some or all of these components may be realized by hardware (circuit part; including circuitry) such as an LSI, an ASIC, an FPGA, or a GPU, or may be realized by software and hardware in cooperation. The program may be stored in a storage device (a storage device including a non-transitory storage medium) such as an HDD or a flash memory in advance, and may be stored in a detachable storage medium (non-transitory storage medium) such as a DVD or a CD-ROM and installed by attaching the storage medium to a drive device.

The agent server 200 includes a storage 250. The storage 250 is realized by the various types of storage devices described above. The storage 250 stores data and programs such as a personal profile 252, a dictionary database (DB) 254, a knowledge base DB 256, and a response rule DB 258.

In the agent device 100, the agent controller 150 transmits a voice stream or a voice stream on which processing such as compression or encoding has been performed to the agent server 200. When a voice command for which local processing (processing that does not go through the agent server 200) is possible is recognized, the agent controller 150 may perform processing requested by the voice command. The voice command for which local processing is possible is a voice command that can be answered by referring to a storage (not shown) included in the agent device 100 or is a voice command (for example, a command or the like for turning on an air conditioner) for controlling the vehicle device 50 in the case of the agent controller 150-1. Therefore, the agent controller 150 may include part of a function included in the agent server 200.

If the agent device 100 acquires a voice stream, the voice recognizer 220 outputs text information obtained by converting the voice stream into text using voice recognition, and the natural language processor 222 interprets a meaning of the text information while referring to the dictionary DB 254. The dictionary DB 254 includes abstracted semantic information and text information in association with each other. The dictionary DB 254 may include list information of synonyms and similar words. The processing of the voice recognizer 220 and the processing of the natural language processor 222 are not clearly divided into stages, and may be performed by interacting with each other, such as the voice recognizer 220 correcting a result of recognition in response to a result of the processing of the natural language processor 222.

For example, the natural language processor 222 generates a command replaced with standard text information "today's weather" when a meaning of "today's weather" or "how is the weather" is recognized as a result of the recognition. As a result, even if there are text variations in a voice of a request, it is possible to facilitate a requested conversation. The natural language processor 222 may recognize the meaning of the text information using artificial intelligence processing such as machine learning processing using probability, or generate a command based on a result of the recognition.

The conversation manager 224 determines content of an utterance to the occupant of the vehicle M while referring to the personal profile 252, the knowledge base DB 256, and the response rule DB 258 on the basis of a result (command) of the processing of the natural language processor 222. The personal profile 252 includes personal information, hobbies and preferences, a history of past conversations, and the like of an occupant stored for each occupant. The knowledge base DB 256 is information which defines relationships between things. The response rule DB 258 is information that defines an operation (such as an answer or content of device control) to be performed by an agent with respect to a command.

The conversation manager 224 may identify the occupant by collating with the personal profile 252 using feature information obtained from the voice stream. In this case, for example, personal information is associated with feature information of voice in the personal profile 252. The feature information of voice is, for example, information on features of someone's speech such as voice pitch, intonation, and rhythm (a pattern of pitch) and a feature amount based on Mel frequency cepstrum coefficients or the like. The feature information of voice is, for example, information obtained by having the occupant utter a predetermined word, sentence, or the like when the occupant is initially registered, and recognizing the uttered voice.

The conversation manager 224 causes the network searcher 226 to perform a search when a command requests information that can be searched for via the network NW. The network searcher 226 accesses various types of web servers 300 via the network NW and acquires desired information. The "information that can be searched for via the network NW" is, for example, a result of an evaluation by a general user of a restaurant near the vehicle M, or a weather forecast according to the position of the vehicle M on that day.

The response sentence generator 228 generates a response sentence so that the content of the utterance determined by the conversation manager 224 is transmitted to the occupant of the vehicle M and transmits the generated response sentence to the agent device 100. The response sentence generator 228 may call the name of the occupant or generate a response sentence in a manner similar to that of the occupant when the occupant is identified as an occupant registered in the personal profile.

If the response sentence is acquired, the agent controller 150 instructs the voice controller 118 to output voice by performing voice synthesis thereon. The agent controller 150 instructs the display controller 116 to display an image of the agent matching the voice output. In this manner, an agent function in which the virtually appearing agent responds to the occupant of the vehicle M is realized.

[Setting Processing]

Processing in which the wake-up word setter 114 changes or adds the starting method of the agent controller 150 will be described. In the following description, an example in which a wake-up word is changed will be described as an example.

Figure 7:
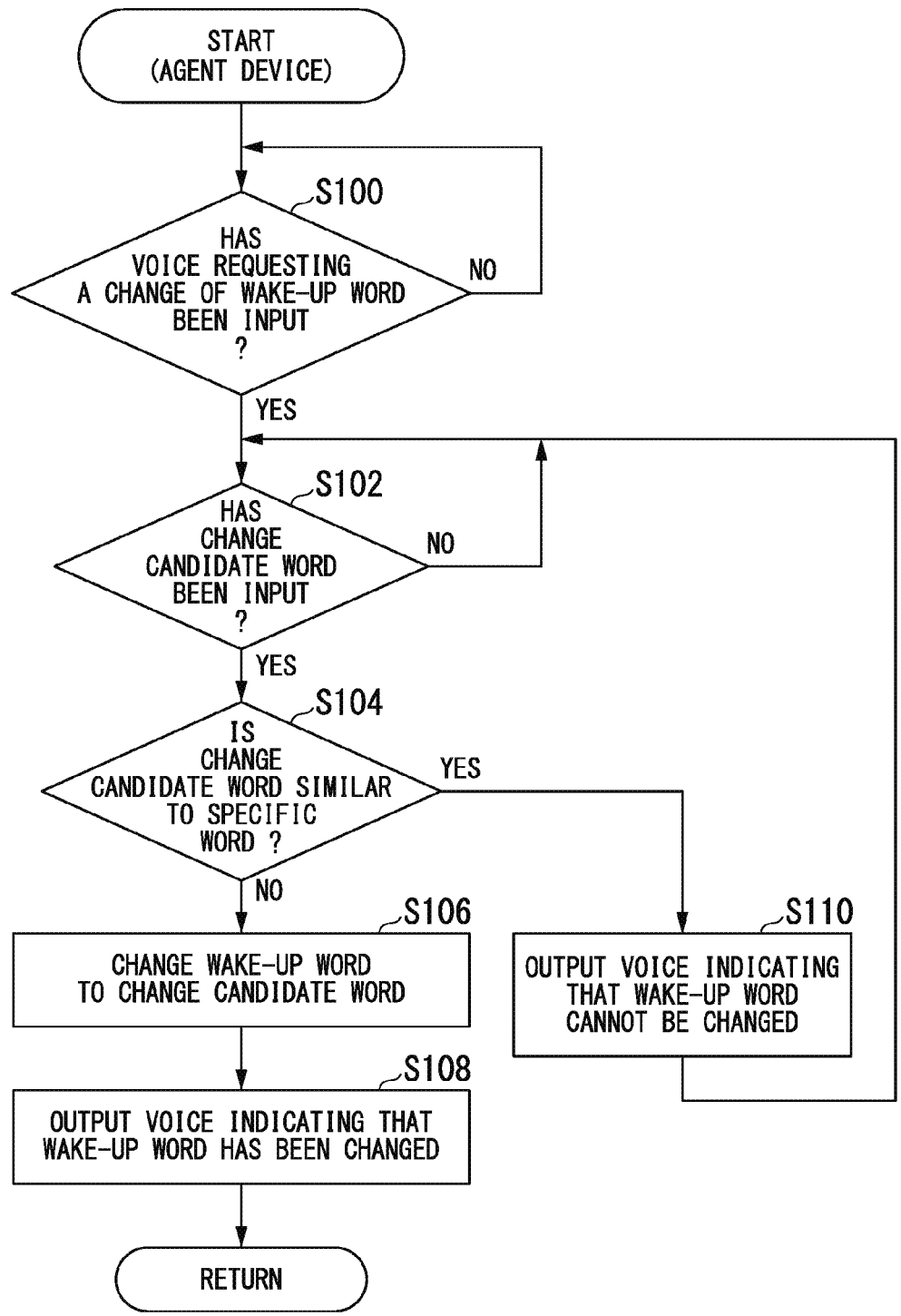
FIG. 7 is a flowchart which shows an example of a flow of processing executed by the agent device.

FIG. 7 is a flowchart which shows an example of a flow of processing executed by the agent device 100. The present processing is, for example, processing executed after the agent controller 150 has started on the basis of a wake-up word set in advance.

First, the wake-up word setter 114 determines whether a voice requesting a change of the wake-up word has been input (step S100). When a voice requesting a change of the wake-up word is input, the wake-up word setter 114 determines whether a wake-up word to be changed (hereinafter, a change candidate word) has been input (step S102). The "voice requesting a change of the wake-up word" is, for example, a voice that indicates an intention to change the wake-up word, such as "I want to change the wake-up word" or "I want to change the word that causes the agent to start." Text information (hereinafter, change information) obtained from the voice indicating an intention to change these wake-up word is stored in the storage 120 in advance. The wake-up word setter 114 refers to the change information stored in the storage 120 to make the determination in step S102 described above.

When the change candidate word is input, the wake-up word setter 114 determines whether the change candidate word is similar to the specific word (step S104). The wake-up word setter 114 refers to the specific word dictionary 122 and determines whether the change candidate word is similar to the specific word.

FIG. 8 is a diagram which shows an example of the content of the specific word dictionary 122. The specific word dictionary 122 is a dictionary in which a plurality of specific words are stored. The specific word is, for example, part or all of the name, surname, full name, nickname, or common name of a person related to the occupant (user) of the vehicle M (hereinafter, these may be referred to as "name, and the like"). The specific word includes, for example, a word similar to the name or the like. When a plurality of agent devices 100 are mounted in the vehicle M, the specific word includes, for example, current names of agents associated with these agent devices 100, and preferably includes the past and current names thereof. In the example of FIG. 8, the surname of the occupant of the vehicle M is "Honda," and the surname and nickname of the person called "Honda," or words similar to these are defined as specific words. A method for generating the specific word dictionary 122 will be described below with reference to FIG. 10.

When the change candidate word is not similar to the specific word, the wake-up word setter 114 changes a wake-up word from the wake-up word set in advance to the change candidate word (step S106). Next, the wake-up word setter 114 causes the agent controller 150 to output a voice indicating that a wake-up word has been changed from the wake-up word set in advance to the change candidate word (step S108). For example, the agent controller 150 outputs a voice such as "I'll register . . . that you entered as a wake-up word." The wake-up word setter 114 changes the wake-up word stored in the storage 120 to a new wake-up word after the change. In this case, the wake-up word setter 114 may cause the storage 120 to store the wake-up word before the change as a history of the set wake-up word.

The change of a wake-up word described above may mean that wake-up words of all the agent controllers 150 included in or managed by the agent device 100 are changed, or that the wake-up word of part or one of the agent controllers 150, which is designated by the occupant, is changed.

If the change candidate word is similar to the specific word, the wake-up word setter 114 causes the agent controller 150 to output a voice indicating that the wake-up word cannot be changed from the wake-up word set in advance to the change candidate word (step S110). For example, the agent controller 150 outputs a voice such as "The input voice corresponds to (associates with) a specific word and thus cannot be registered as a wake-up word." Accordingly, processing of one routine of this flowchart ends.

With the processing described above, a wake-up word that matches the preference of the occupant is set. As described above, since the agent device 100 can provide a starting method that matches the preference of the occupant, the occupant can feel more familiar with the agent provided by the agent controller 150 and the satisfaction level of the occupant is improved. When the occupant has called the name or the like of a occupant who is present in the vehicle interior without having an intention to cause the agent controller 150 to start, it is possible to curb the agent controller 150 from starting. As a result, convenience of the occupant can be improved.

[Processing of Starting Agent Controller]

Figure 9:
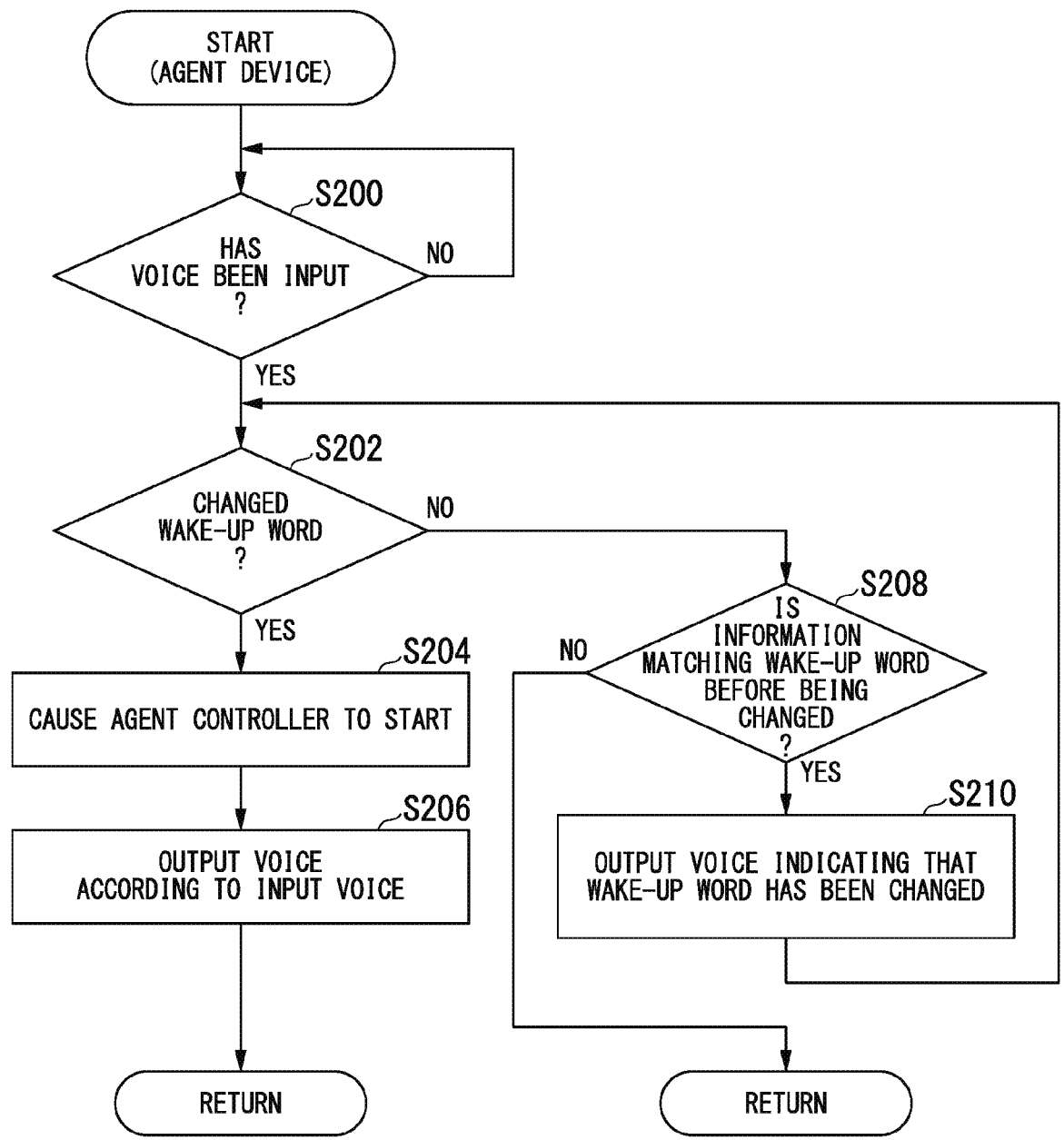
FIG. 9 is a flowchart which shows an example of processing started by an agent controller.

FIG. 9 is a flowchart which shows an example of processing of starting the agent controller 150. The present processing is, for example, processing executed after a wake-up word is changed in processing of the flowchart in FIG. 7.

The WU determiner for each agent 113 determines whether a voice has been input (step S200). When a voice is input, the WU determiner for each agent 113 determines whether information obtained from the input voice matches the wake-up word changed in the processing of the flowchart in FIG. 7 (step S202). The term "match" is not limited to a complete match, and may include a case in which an obtained degree of matching is equal to or higher than a predetermined degree.

When it is determined that the information obtained from the input voice matches the wake-up word changed in the processing of the flowchart in FIG. 7, the WU determiner for each agent 113 causes the agent controller 150 associated with the changed wake-up word to start (step S204). The "agent controller 150 associated with the changed wake-up word" is an agent controller 150 in which the wake-up word is changed in the processing of the flowchart in FIG. 7. Next, the agent controller 150 causes the voice controller 118 to output voice according to the input voice (step S206), and thereby processing of one routine of this flowchart ends.

When it is determined that the information obtained from the input voice does not match the wake-up word changed in the processing of the flowchart in FIG. 7, the WU determiner for each agent 113 determines whether the information obtained from the input voice matches a wake-up word before being changed in the processing of the flowchart in FIG. 7 (step S208). When the information obtained from the input voice does not match the wake-up word before being changed in the processing of the flowchart in FIG. 7, the processing of one routine of this flowchart ends.

If it is determined that the information obtained from the input voice matches the wake-up word before being changed in the processing of the flowchart in FIG. 7, the WU determiner for each agent 113 causes the agent controller 150 to output a voice indicating that a wake-up word has been changed (step S210), and the procedure returns to the processing of step S202. As a result, the occupant notices that a wake-up word has been changed or remembers that a wake-up word has been changed.

The processing of steps S200, S202, and S208 is repeated, and when it is determined that the information obtained from the input voice matches the wake-up word before being changed in the processing of the flowchart in FIG. 7 a plurality of times, the processing of step S210 may be performed.

With the processing described above, the occupant can cause the agent controller 150 to start in a starting method that matches his or her own preferences. The agent device 100 can cause the occupant to recognize that a wake-up word has been changed when the occupant is intending to cause the agent controller 150 to start using a wake-up word before the change. As a result, the convenience of the occupant is improved.

[Method of Generating Specific Word Dictionary]

Figure 10:
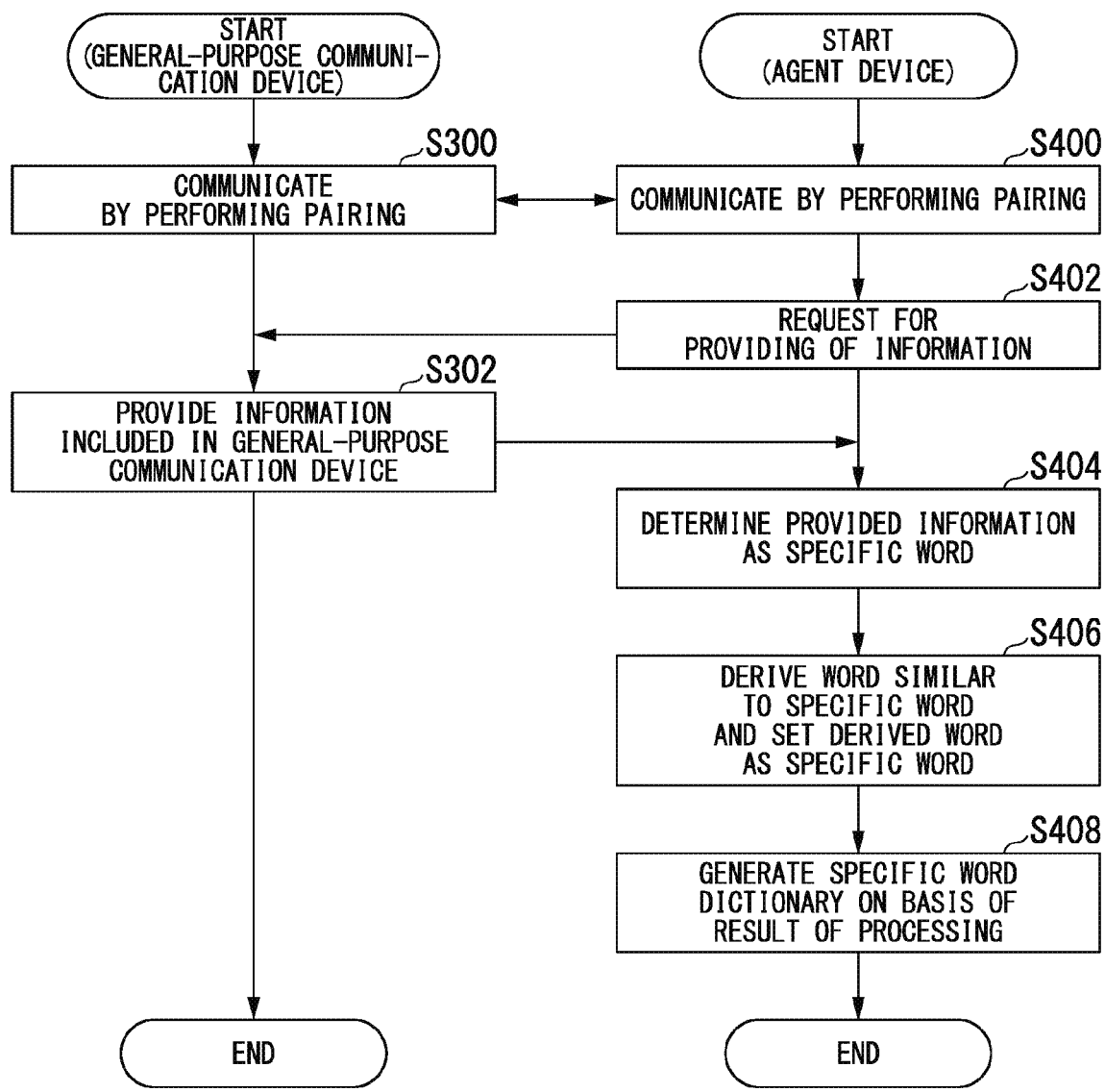
FIG. 10 is a diagram which shows an example of a flowchart of a flow of processing executed by a general-purpose communication device and the agent device.

FIG. 10 is a diagram which shows an example of a flowchart of a flow of processing executed by the general-purpose communication device 70 and the agent device 100. First, the general-purpose communication device 70 and the agent device 100 perform pairing and communicate with each other (steps S300 and S400). Next, the generator 119 of the agent device 100 requests the general-purpose communication device 70 to provide information (step S402). The information requested to be provided by the generator 119 is, for example, a name, a surname, a full name, a nickname, or a common name of the occupant or a person (or animal) related to the occupant, or information for identifying these. In the following description, the information described above may be collectively referred to as "specific word candidates." The information requested to be provided by the generator 119 is, for example, contact list information stored in the general-purpose communication device 70 or information of a contact address that has been used at a predetermined frequency in the contact list information.

The general-purpose communication device 70 provides information stored therein to the agent device 100 in response to the request in step S402 (step S302). For example, the general-purpose communication device 70 may cause a display thereof to display information inquiring whether to approve providing the information, and provide the information to the agent device 100 when the occupant of the general-purpose communication device 70 has performed an operation to approve providing the information. The general-purpose communication device 70 may provide only the information designated by the occupant to the agent device 100 on the basis of the operation of the occupant.

When the agent device 100 holds information such as the contact list information and does not need to request the general-purpose communication device 70 to provide information, the processing of steps S300, S302, S400, and S402 may be omitted.

Next, the generator 119 of the agent device 100 determines part or all of the information provided by the general-purpose communication device 70 as a specific word (step S404). The generator 119 may use, for example, the name, surname, full name, nickname, common name, or the like of the occupant among specific word candidates as a specific word, and may extract a specific word on the basis of a predetermined reference.

Next, the generator 119 derives a word that is similar to the specific word determined in step S404, and determines the derived word as a specific word (step S406). For example, the generator 119 may derive a word that is similar to the specific word using a predetermined method, and may also request another device to derive a similar word. For example, the generator 119 converts the specific word into a vector, refers to a specific dictionary stored in the storage device, and derives a word having a vector similar to a vector associated with the specific word as a similar word. For example, the specific dictionary is a dictionary in which a vector and a word associated with the vector are associated with each other. Being similar means, for example, that a cosine similarity is a predetermined degree or more. The generator 119 may derive a word similar to the specific word using a known natural language analysis method such as word2vec.

Next, the generator 119 generates the specific word dictionary 122 on the basis of the specific word extracted in step S406 and a specific word similar to the specific word and causes the storage 120 to store the generated specific word dictionary 122 (step S408). As a result, processing of one routine of the flowchart ends.

With the processing described above, the agent device 100 can easily acquire the specific word dictionary 122 or acquire the specific word dictionary 122 with higher accuracy.

[Mode Setting for Response Processing of Agent Controller]

When it is estimated that the wake-up word is a word (or name) indicating a male or a female, the agent controller 150 provides a service including causing an output device to output a voice response on the basis of a result of the estimation. Providing service including causing an output device to output a voice response on the basis of a result of the estimation involves, for example, the agent controller 150 providing a voice response using a male tone or accent when the result of the estimation is a male name, and providing a voice response using a female tone or accent when the result of the estimation is a female name.

Providing service including causing an output device to output a voice response on the basis of a result of the estimation may involve, for example, the agent controller 150 providing a service including a voice response and an image. In this case, the image is an image according to a voice, and is, for example, a male image when the result of the estimation is a male name, and a female image when the result of the estimation is a female name. The agent device 100 determines which type the wake-up word is classified into among a plurality of types such as the first type or the second type and provides a service including a voice response on the basis of a result of the determination.

Figure 11:
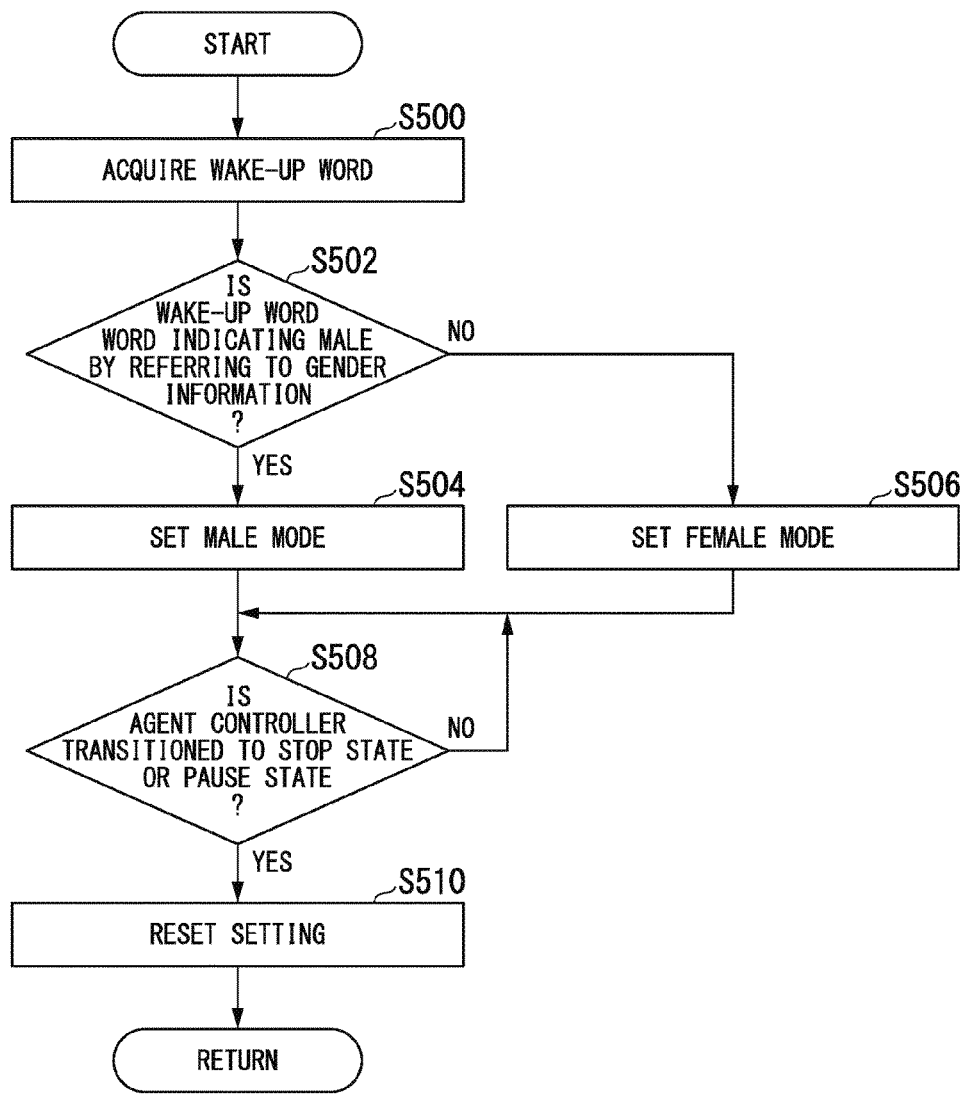
FIG. 11 is a flowchart which shows an example of a flow of processing of setting a mode for response processing executed by the agent device.

FIG. 11 is a flowchart which shows an example of a flow of processing of setting a mode for response processing executed by the agent device 100. Processing in this flowchart is, for example, processing executed after the agent controller 150 has started.

First, the mode setter 115 of the agent device 100 acquires a wake-up word (step S500). Next, the mode setter 115 refers to the gender information 124 and determines whether the wake-up word is a word indicating a male (step S502).

The gender information 124 is information including a word indicating a male or a female in each country. For example, when a predetermined word is included in the wake-up word, the mode setter 115 may determine whether the word indicates a male or a female, or may divide the word included in the wake-up word, derive a score for each word, and determine whether the wake-up word is a word indicating a male or a female on the basis of a result of integrating the derived scores. For example, in this case, a score is assigned to a word in the gender information 124. For example, in the gender information 124, when the score of "Sachi" is registered as 1 point, and the score of a word with "ko" at the end is registered as 2 points as a word indicating a female, a total score of "Sachiko" is three points. For example, if a threshold is set as three points, the wake-up word "Sachiko" is determined to indicate a female.

For example, the mode setter 115 may determine whether the word is a word indicating a male or a word indicating a female using a learned model (not shown). The learned model is a model such as a neural network. For example, the learned model is a model generated by a learning device (not shown) performing machine learning on learning data including information indicating a word and a gender. For example, the learning device is a model in which learning data is learned to output information with a high probability of indicating a male when a word associated with a male is input, or to output information with a probability of indicating a female when a word associated with a female is input. The occupant may designate a gender of the wake-up word by inputting a voice or the like. In this case, the mode setter 115 may determine the gender of the wake-up word based on the designated information that is stored in the storage 120.

Returning to the description of FIG. 11, when it is estimated that the wake-up word is a word indicating a male, the mode setter 115 sets a response mode to a male mode (step S504). When it is estimated that the wake-up word is a word indicating a female, the mode setter 115 sets the response mode to a female mode (step S506). For example, the mode setter 115 causes the storage 120 to store the set mode (mode information 126). The agent controller 150 refers to the mode information 126 stored in the storage 120 and provides a service including a voice response according to the voice of the occupant on the basis of a mode set by the mode setter 115.

Next, the mode setter 115 determines whether the agent controller 150 has transitioned from a wake-up state to a stop state or a pause state (step S508). The stop state or the pause state is a state in which the agent controller 150 does not respond unless the occupant inputs a wake-up word again. When the agent controller 150 has transitioned from the wake-up state to the stop state or the pause state, the mode setter 115 resets the mode set in step S504 or S506 (step S510). As a result, processing of one routine of this flowchart ends.

Figure 12:
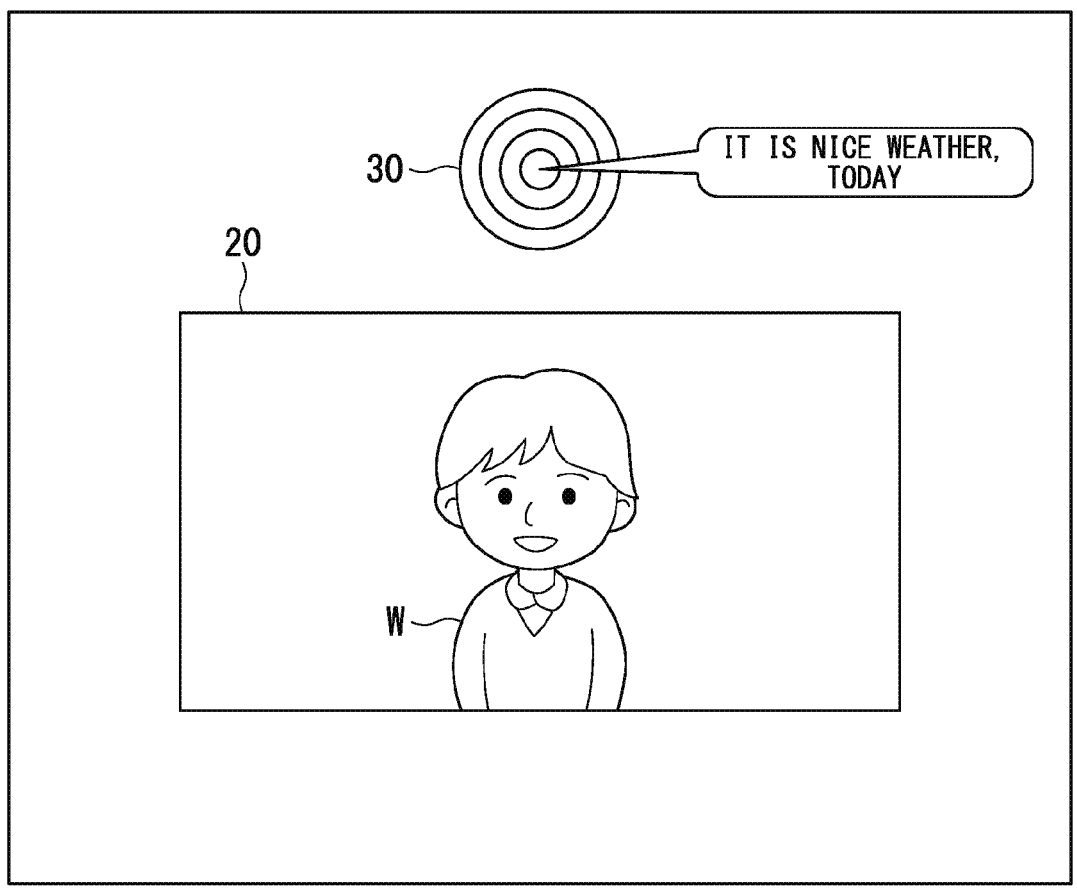
FIG. 12 is a diagram which shows an example of information output by the agent controller.

FIG. 12 is a diagram which shows an example of information output by the agent controller 150. For example, it is assumed that the mode setter 115 has set the female mode. In this case, the agent controller 150 causes the speaker 30 to output a response with a female voice tone or accent (for example, "The weather is nice today") to the speaker 30 on the basis of the female mode, or causes the display/operation device 20 to display an image indicating a character W indicating an appearance of a female. If the male mode is set, the agent controller 150 causes the speaker 30 to output a response of a male voice tone or accent (for example, "The weather is nice today") to the speaker 30 on the basis of the male mode, or causes the display/operation device 20 to display an image indicating a character indicating an appearance of a male.

Response content may differ according to a mode. For example, the female mode may be a mode in which the response content is response content of a female, and the male mode may be a mode in which the response content is response content of a male. For example, in the case of the female mode, the agent controller 150 responds "cute" regarding a certain object, and in the case of the male mode, the agent controller 150 responds "cool" regarding the certain object. For example, the agent controller 150 may perform a response by referring to information in which response content prepared for each mode is defined.

With the processing described above, the agent device 100 performs a response in a manner that matches the preference of a user, and thus the satisfaction level of the user is further improved.

According to the first embodiment described above, it is possible to provide a starting method matching the preference of a user by including one or more agent controllers 150 that provide a service including a voice response according to the voice of the occupant collected in the vehicle interior of a vehicle, the sound processor 112 that receives an input by the occupant, and the wake-up word setter 114 that changes or adds the starting method of the agent controller 150 on the basis of content received by the sound processor 112.

Second Embodiment

Hereinafter, a second embodiment will be described. In the second embodiment, the agent device 100 changes information to be referred to when making a response in accordance with a wake-up word used for starting. In the following description, differences from the first embodiment will be mainly described.

Figure 13:
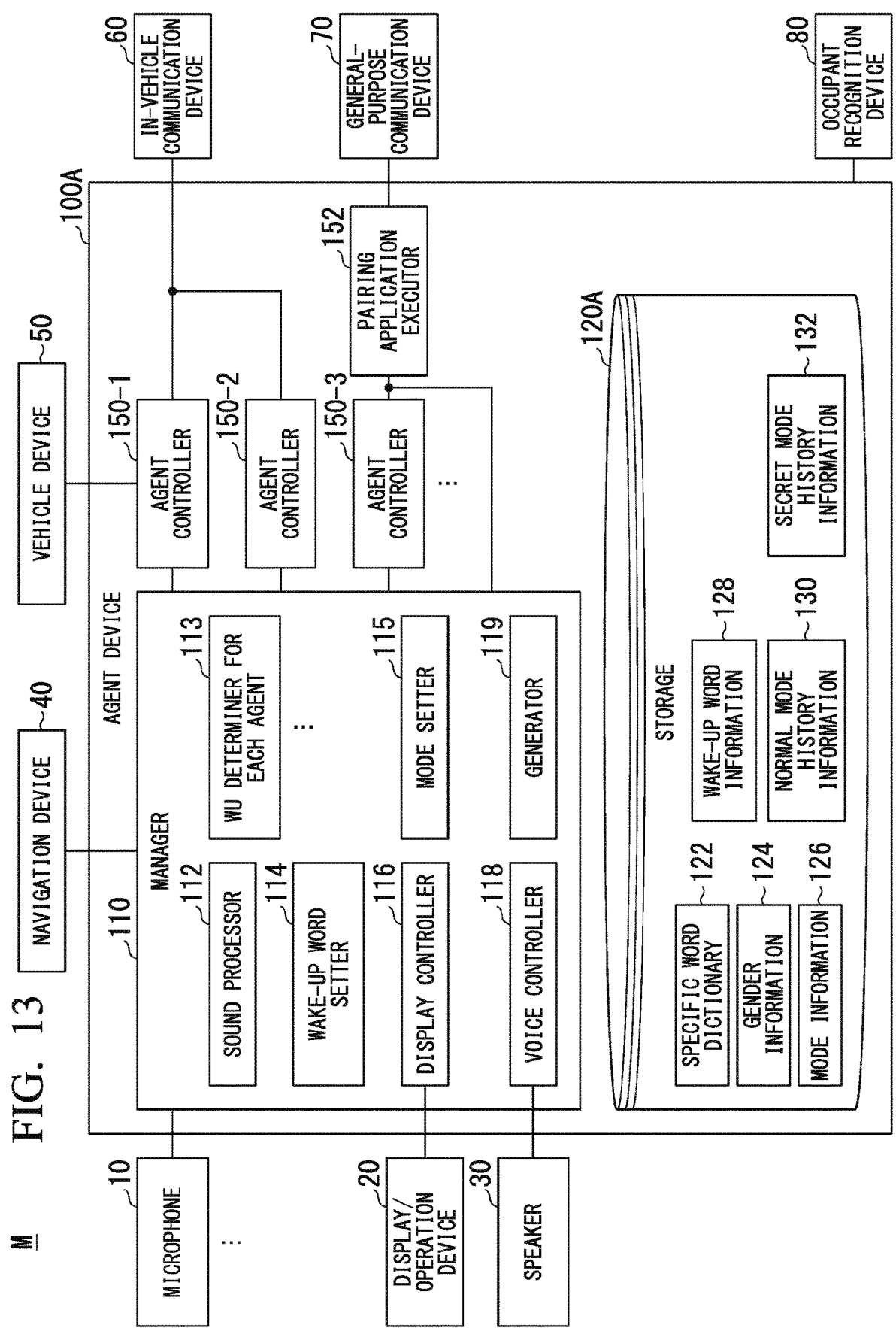
FIG. 13 is a diagram which shows a configuration of an agent device according to a second embodiment and devices mounted in the vehicle.

FIG. 13 is a diagram which shows a configuration of the agent device 100A according to the second embodiment and devices mounted in the vehicle M. The agent device 100A includes a storage 120A instead of the storage 120 of the agent device 100. The storage 120A stores wake-up word information 128, normal mode history information 130, and secret mode history information 132 in addition to the information stored in the storage 120. Details of the wake-up word information 128, the normal mode history information 130, and the secret mode history information 132 will be described below.

[Registration of Wake-Up Word]

Figure 14:
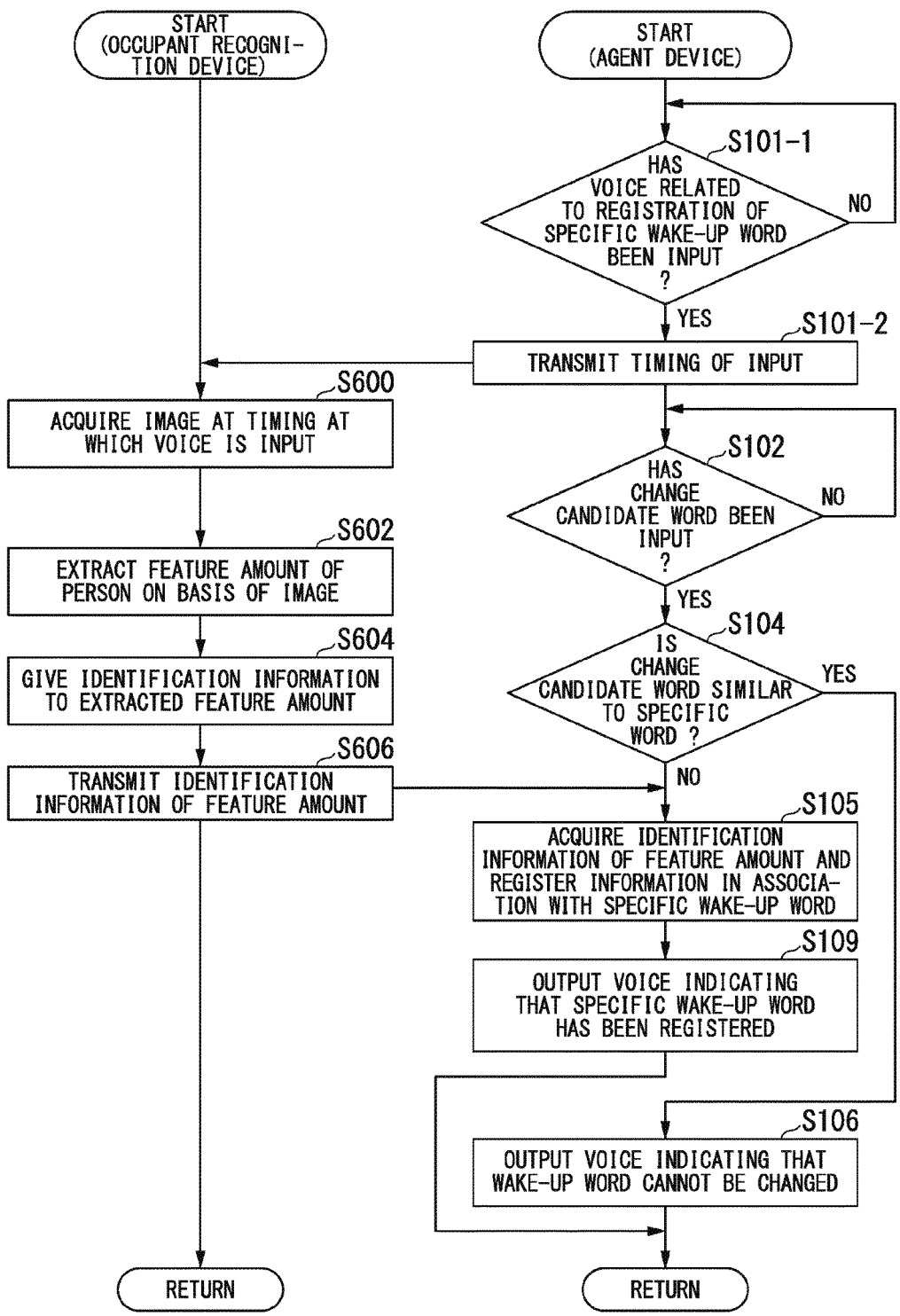
FIG. 14 is a diagram (part 1) which shows an example of a flowchart of a flow of processing executed by an occupant recognition device and the agent device.

FIG. 14 is a diagram (part 1) which shows an example of a flowchart of a flow of processing executed by the occupant recognition device 80 and the agent device 100. In the present processing, it is assumed that the camera in the vehicle interior of the occupant recognition device 80 captures an image of a situation inside the vehicle interior at predetermined intervals.

First, the wake-up word setter 114 of the agent device 100 determines whether a voice related to registration of a wake-up word (hereinafter, a specific wake-up word) in the secret mode has been input (step S101-1). The voice related to the registration of a specific wake-up word is, for example, a voice such as "Please register a wake-up word in the secret mode." The secret mode is a mode in which the agent controller 150 provides a service to only an identified occupant (for example, an occupant who has registered a wake-up word). The normal mode is a mode in which the agent controller 150 provides a service to an occupant (an unidentified occupant) different from the identified occupant.

When the voice related to the registration of a specific wake-up word is input in step S101-1, the wake-up word setter 114 transmits a timing at which a voice is input in step S101-1 to the occupant recognition device 80 (step S101-2). Since processing in steps S102, S104, and S106 of FIG. 14 is the same as the processing in steps S102, S104, and S106 of FIG. 7, description thereof will be omitted.

The occupant recognition device 80 extracts an image captured at the timing at which the voice transmitted in step S101-1 is input (step S600). Next, the occupant recognition device 80 extracts a feature amount of an occupant who has input a voice in step S101-1 on the basis of the extracted image (step S602). The feature amount of the occupant is, for example, a distribution of a feature amount of the face of the occupant (for example, an index based on a luminance value). For example, the occupant recognition device 80 identifies the occupant who has input a voice in step S101-1 on the basis of a state of the mouth of the occupant, a position of the microphone 10 to which the voice has been input, and input data for each microphone 10.

Next, the occupant recognition device 80 adds identification information to the feature amount extracted in step S602 (step S604), and transmits the identification information added to the feature amount to the agent device 100 (step S606). A storage device of the occupant recognition device 80 stores information in which the extracted feature amount is associated with the identification information. When the occupant recognition device 80 has already given the identification information to the extracted feature amount in step S604 in the past processing, the identification information is used.

Next, the wake-up word setter 114 acquires the identification information of the feature amount transmitted in step S606 and registers the acquired identification information in association with the input wake-up word (step S105). As a result, the wake-up word information 128 is generated. Next, the wake-up word setter 114 causes the agent controller 150 to output a voice indicating that a specific wake-up word has been registered (step S109). For example, the agent controller 150 outputs a voice such as "I'll register . . . that you input as a wake-up word in the secret mode." As a result, processing of one routine of this flowchart ends.

FIG. 15 is a diagram which shows an example of content of the wake-up word information 128. The wake-up word information 128 is information that includes information in which the identification information of the feature amount registered in the secret mode is associated with the specific wake-up word, and a wake-up word (a wake-up word which is not associated with the identification information of the feature amount) changed or added in the normal mode. In processing of changing a wake-up word in the normal mode, the processing of the flowchart in FIG. 7 is used.

According to the processing described above, a specific wake-up word is registered.

The registration of a wake-up word in a secret mode may not be performed when there is an occupant different from an occupant who has input the wake-up word.

Part or all of the processing of the occupant recognition device 80 described in FIG. 14 may be performed in the agent device 100A. For example, the agent device 100 may extract a feature amount from an image.

[Processing of Starting Agent Controller]

Figure 16:
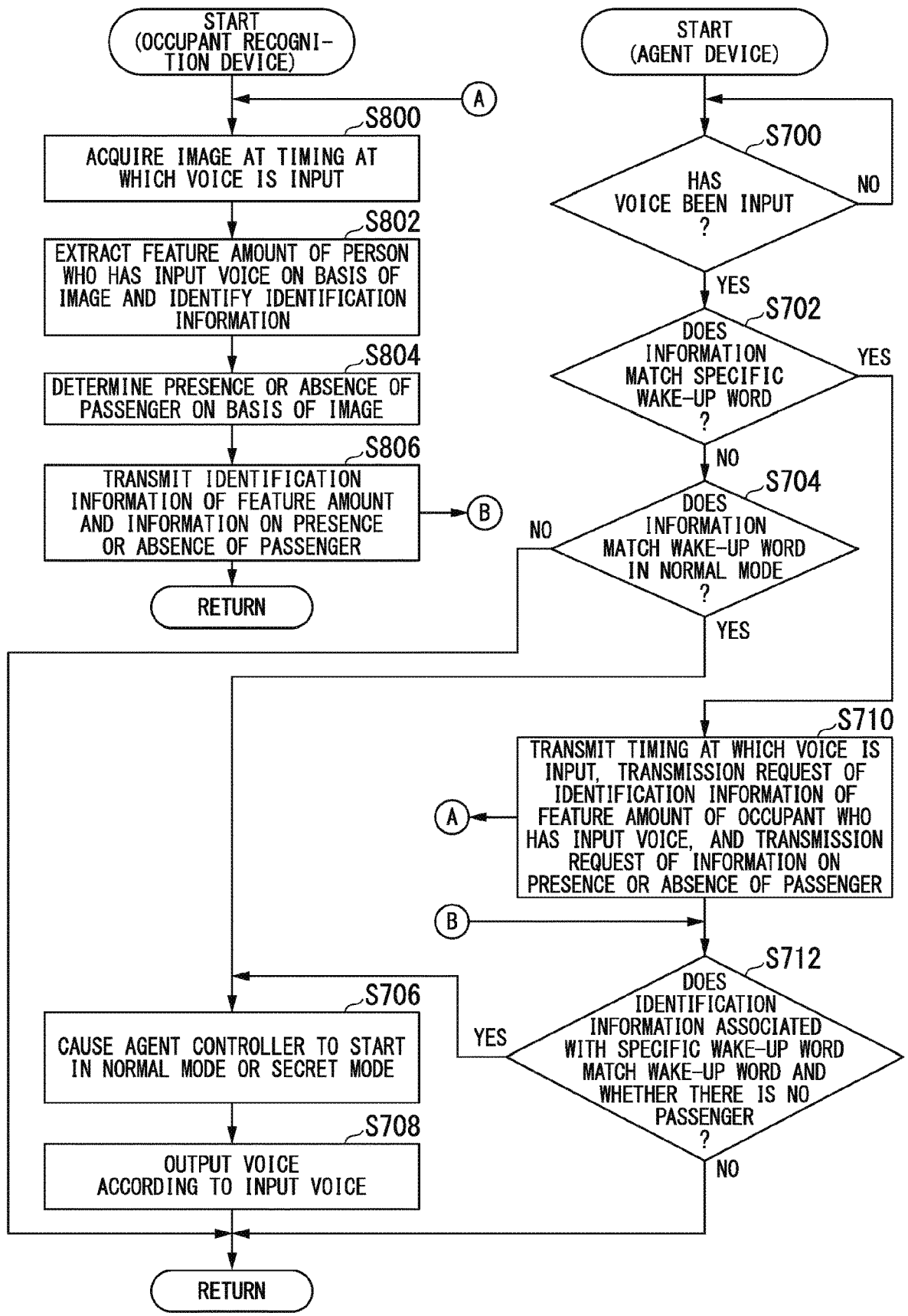
FIG. 16 is a diagram (part 2) which shows an example of the flowchart of the flow of processing executed by the occupant recognition device and the agent device.

FIG. 16 is a diagram (part 2) which shows an example of the flowchart of the flow of processing executed by the occupant recognition device 80 and the agent device 100. In this processing, when it is determined that a specific wake-up word has been input by an occupant different from a first occupant who has set a specific wake-up word (a first starting keyword) as a starting keyword on the basis of a result of detection by the occupant recognition device 80, the agent device 100 does not start according to the specific wake-up word, and, when it is determined that a specific wake-up word is input by the first occupant on the basis of a result of the detection by the occupant recognition device 80, the agent device 100 starts according to the specific wake-up word. In the present processing, it is assumed that the camera in the vehicle interior of the occupant recognition device 80 captures an image of the scene inside the vehicle interior at predetermined intervals.

The WU determiner for each agent 113 determines whether a voice has been input (step S700). When a voice has been input, the WU determiner for each agent 113 determines whether information obtained from the input voice matches the specific wake-up word by referring to the wake-up word information 128 (step S702).

When it is determined that the information obtained from the input voice does not match the specific wake-up word, the WU determiner for each agent 113 refers to the wake-up word information 128 and determines whether the information obtained from the input voice matches a wake-up word in the normal mode (step S704). When the information obtained from the input voice does not match the wake-up word in the normal mode, processing of one routine of this flowchart ends.

When it is determined that the information obtained from the input voice matches the wake-up word in the normal mode, the WU determiner for each agent 113 starts a corresponding (associated) agent controller 150 in the normal mode (step S706). Next, the agent controller 150 causes the voice controller 118 to output a voice according to the input voice (step S708), and the processing of one routine of this flowchart ends.

When it is determined that the information obtained from the input voice in step S702 matches the specific wake-up word, the WU determiner for each agent 113 transmits information indicating the timing at which the voice has been input, a transmission request of identification information of the feature amount of the occupant who has input the voice, and a transmission request of information on a presence or absence of a passenger to the occupant recognition device 80 (step S710).

In response to the request transmitted in step S710, the occupant recognition device 80 acquires an image captured at the timing at which the voice is input (step S800). Next, on the basis of the image acquired in step S800, the occupant recognition device 80 extracts the feature amount of a person who has input the voice, and furthermore, identifies the identification information of the extracted feature amount of the occupant by referring to a result of the processing of the flowchart of FIG. 14 stored in the storage device thereof (step S802). Next, based on the image acquired in step S800, the occupant recognition device 80 determines whether a person other than the person who has input the voice is present in the vehicle interior (step S804).

Next, the occupant recognition device 80 transmits the information obtained in steps S802 and S804 to the agent device 100 (step S806). The information obtained in steps S802 and S804 is the identification information of the feature amount of the occupant who has input the voice, and the information on the presence or absence of a passenger (information indicating whether an occupant other than the occupant who has input the voice is present in the vehicle interior).

Next, the WU determiner for each agent 113 acquires the information transmitted in step S806, refers to the wake-up word information 128, and determines whether the identification information of the acquired feature amount is associated with the wake-up word input in step S700, and whether there is a passenger (step S712). When the identification information of the acquired feature amount is not associated with the wake-up word input in step S700, or when there is a passenger, processing of one routine of this flowchart ends.

When the identification information of the acquired feature amount is associated with the wake-up word input in step S700 and there is no passenger, the WU determiner for each agent 113 causes a corresponding (associated) agent controller 150 to start in the secret mode (step S706). Next, the agent controller 150 causes the voice controller 118 to output a voice according to the input voice (step S708), and processing of one routine of this flowchart ends.

With the processing described above, the agent device 100 switches control modes according to a registered wake-up word. As a result, the occupant can cause the agent controller 150 to start in a desired mode.

In the example described above, it is assumed that a feature amount obtained from an image is used, but the feature amount may be a voice feature amount obtained from a voice instead of (or in addition to) the feature amount obtained from an image.

The starting condition of the agent controller 150 in the secret mode may be that only an occupant that has boarded when the wake-up word in the secret mode is registered is present or may be that a designated occupant is boarding instead of (in addition to) that only an occupant that has registered a specific wake-up word is present in the vehicle interior. In this case, the identification information of the feature amount of each occupant is associated with the specific wake-up word in the processing of FIG. 14, and it is determined that an occupant who has given the identification information associated with the specific wake-up word is boarding in the processing of FIG. 16.

In the processing of step S712 described above, determination on the presence or absence of a passenger may be omitted. That is, when the occupant that has registered the specific wake-up word has input the specific wake-up word, the agent controller 150 may start in the secret mode. In this case, transmission and reception of the information regarding the presence or absence of a passenger will be omitted.

When a specific wake-up word has been input and it is determined that an occupant other than a first occupant associated with the specific wake-up word is present in the vehicle interior of the vehicle on the basis of a result of the detection by the occupant recognition device 80, the agent controller 150 may not start according to the specific wake-up word, and, when a specific wake-up word has been input and it is determined that an occupant other than the first occupant associated with the specific wake-up word is not present in the vehicle interior of the vehicle on the basis of a result of the detection by the occupant recognition device 80, the agent controller 150 may start according to the specific wake-up word.

[Processing after Starting Agent Controller]

Figure 17:
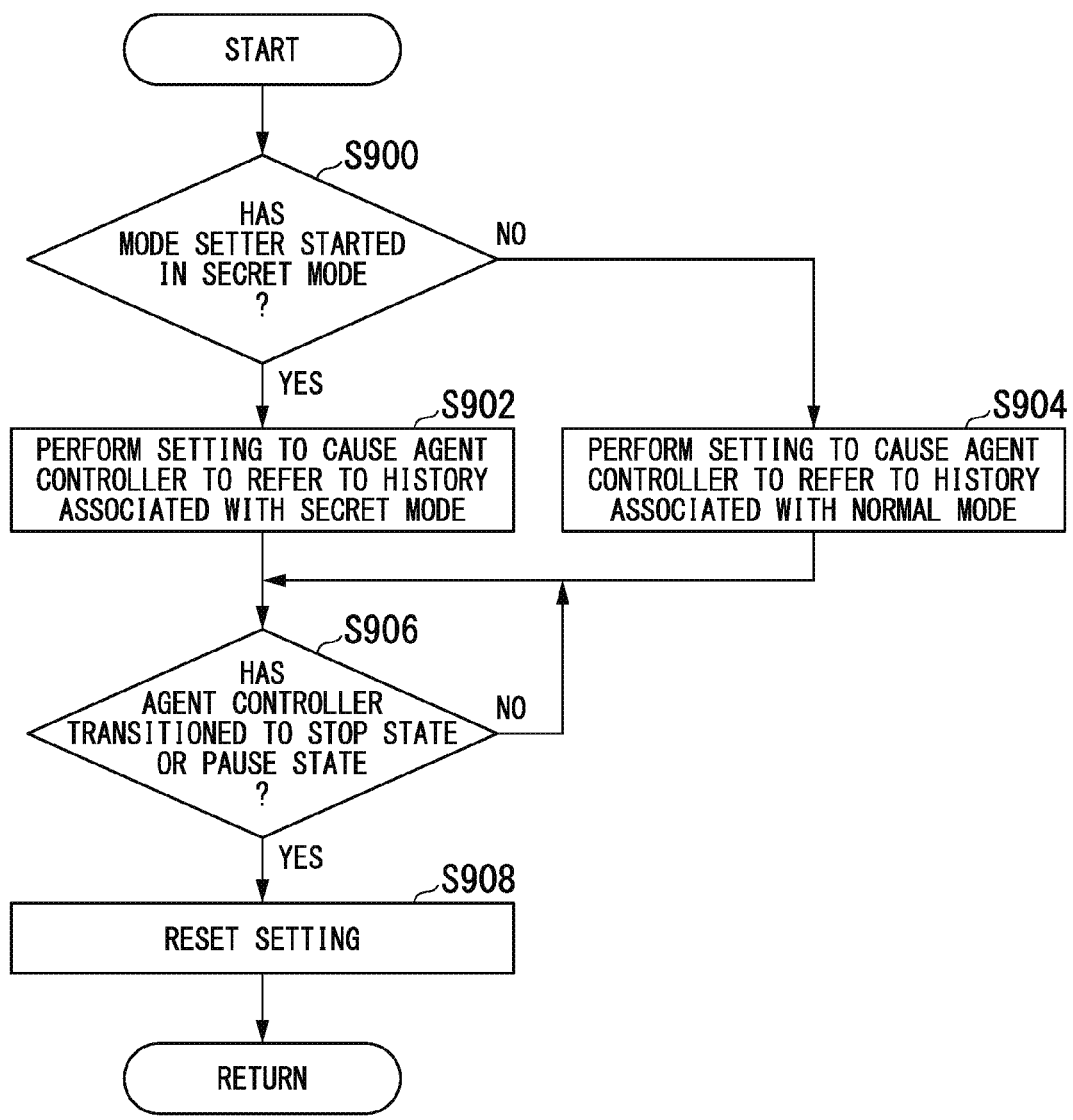
FIG. 17 is a flowchart which shows an example of a flow of part of processing in response processing executed by the agent device.

FIG. 17 is a flowchart which shows an example of a flow of part of processing in response processing executed by the agent device 100. When the agent controller 150 has started with a starting keyword different from the specific wake-up word, the agent controller 150 does not refer to an operation history at the time of having started with the specific wake-up word. The processing of this flowchart is, for example, processing that is executed after the agent controller 150 has started (for example, processing that is performed when the agent controller 150 has started in the processing of step S706).

First, it is determined whether the mode setter 115 of the agent device 100 has started in the secret mode (step S900). When the mode setter has started in the secret mode, the mode setter 115 performs setting to cause the agent controller 150 to refer to the secret mode history information 132 (step S902). The secret mode history information 132 is information on a history of processing performed when the agent controller 150 has been set to be in the secret mode.

If the mode setter 115 has not started in the secret mode (has started in the normal mode), the mode setter 115 sets the agent controller 150 to refer the normal mode history information 130 (step S904). The normal mode history information 130 is information on a history of processing performed when the agent controller 150 has been set to be in the normal mode. As a result, the agent controller 150 refers to a history of processing in accordance with a mode set in step S902 or S904 and performs a response in accordance with the voice of the occupant.

Next, the mode setter 115 determines whether the agent controller 150 has transitioned from the wake-up state to the stop state or the pause state (step S906). When the agent controller 150 has transitioned from the wake-up state to the stop state or the pause state, the mode setter 115 resets setting in step S902 or S906 (step S510). As a result, processing of one routine of this flowchart ends.

According to the processing described above, since the agent controller 150 refers to a history of a started mode and performs a response, the convenience and satisfaction level of the occupant are improved.

Figure 18:
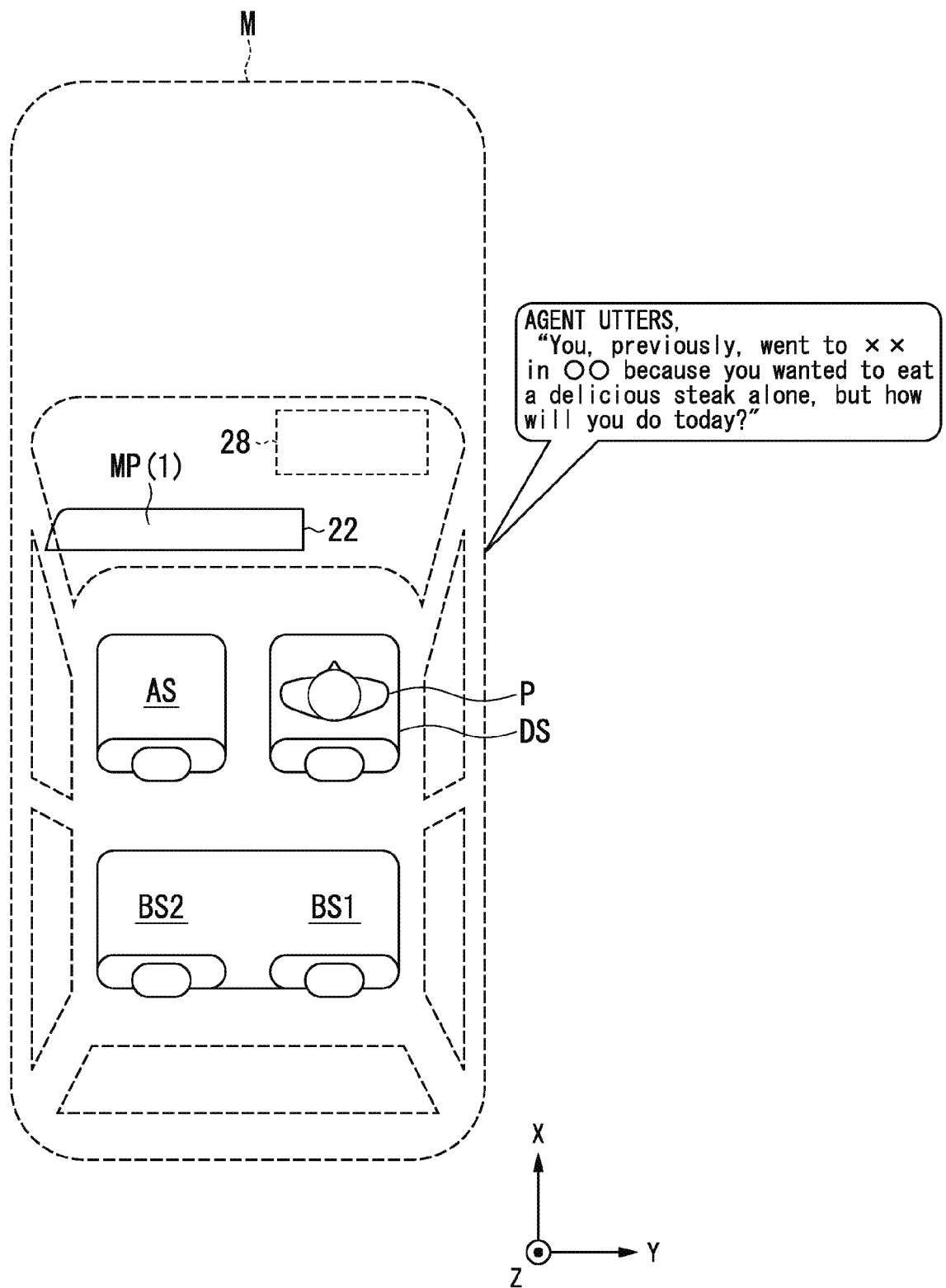
FIG. 18 is a diagram which shows an example of a response performed by the agent controller started in a secret mode.

FIG. 18 is a diagram which shows an example of a response performed by the agent controller 150 started in the secret mode. For example, when the agent controller 150 has started in the secret mode in the past, in a case in which the occupant has utterance, "Tell me a store where I can eat a delicious steak alone," and the agent has uttered, "How about xx in OO," the content of this conversation is stored in the secret mode history information 132. After that, when the occupant has caused the agent controller 150 to start in the secret mode, for example, the agent controller 150 refers to the secret mode history information 132 and utters, "You, previously, went to xx in OO because you wanted to eat a delicious steak alone, but how will you do today?"

In this manner, since conversations performed in the secret mode are referred to only in the secret mode and are not referred to in the normal mode, a service that has considered privacy of the occupant is provided.

According to the second embodiment described above, since the manager 110 sets or changes a wake-up word using a result of the detection by the occupant recognition device 80 that detects the occupant of a vehicle, it is possible to provide a starting method matching the preference of a user.

In each embodiment described above, the manager 110 (110A) may change or add the starting method of all or part of the agent controllers 150 among the plurality of agent controllers 150. For example, the manager 110 changes or adds the starting method of an agent controller 150 designated by the occupant or a predetermined agent controller 150.

Modified Example (Part 1)

Figure 19:
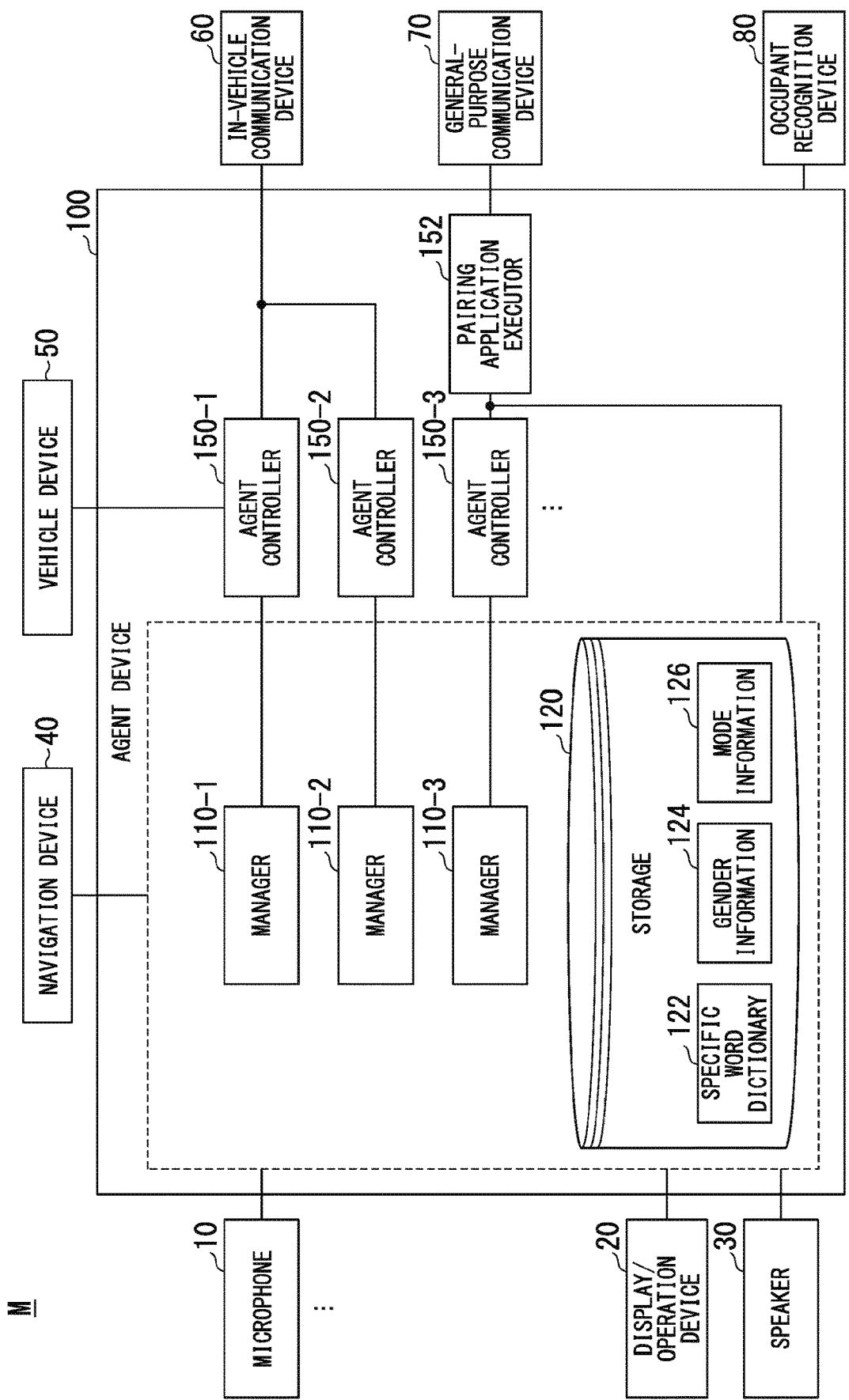
FIG. 19 is a diagram which shows an example of functional constituents of an agent device according to a modified example.

FIG. 19 is a diagram which shows an example of functional constituents of an agent device 100B of a modified example. The agent device 100B includes managers 110-1 to 110-3 instead of the manager 110. Each of the managers 110-1 to 110-3 includes the same functional constituent as the manager 110. Each of the managers 110-1 to 110-3 changes or adds, for example, a starting method of a corresponding (associated) agent controller 150.

Part or all of the processing performed by the occupant recognition device 80 or the agent device 100 in each of the embodiments described above may be performed by another device. The processing order of each flowchart described above may be changed as appropriate, or part of the processing may be omitted.

Modified Example (Part 2)

The wake-up word setter 114 may change or add the starting method of the agent controller 150 on the basis of a behavior performed by the occupant. The behavior is, for example, clapping, a gaze movement, a gesture, and the like. For example, when the behavior of the occupant recognized by the occupant recognition device 80 is to change or add the starting method of the agent controller 150, the wake-up word setter 114 sets the behavior as a trigger for starting of the agent controller 150. In this case, when the behavior that is a trigger for starting the agent controller 150 is performed by the occupant, the WU determiner for each agent 113 causes a corresponding (associated) agent controller 150 to start.

The modes for implementing the present invention have been described using the embodiments. However, the present invention is not limited to these embodiments, and various modifications and substitutions may be made within a range not departing from the gist of the present invention.

What is claimed is:
1. An agent device comprising:
a camera that is provided in a vehicle interior and that images an occupant of the vehicle;
an occupant detector configured to detect the occupant of the vehicle;
one or more agent controllers configured to provide a service including causing an output device to output a response of voice according to a voice of the occupant which is collected in a vehicle interior of a vehicle;
a receiver configured to receive an input from the occupant;
a starting method setter configured to change or add a starting method of the agent controller on the basis of content received by the receiver, wherein
the occupant detector acquires an image that is imaged by the camera when the receiver receives a first starting keyword, the first starting keyword being a word that is set by the first occupant and for causing the one or more agent controllers to start,
the occupant detector refers to a first reference information to determine whether a feature of the first occupant extracted from the image matches a feature associated with identification information of the first occupant in the first reference information or not,
the first reference information being the feature of the first occupant extracted from an image and the identification information of the first occupant are associated with each other,
the occupant detector determines that the first occupant has input the first starting keyword to the receiver when the feature of the first occupant extracted from the image is determined to match the feature associated with identification information of the first occupant, the occupant detector determines that the first occupant has not input the first starting keyword to the receiver when the feature of the first occupant extracted from the image is determined to not match the feature associated with identification information of the first occupant, the one or more agent controllers do not start in accordance with the first starting keyword when the receiver receives the first starting keyword and the occupant detector determines that the first occupant has not input the first starting keyword, the one or more agent controllers start in accordance with the first starting keyword when the receiver receives the first starting keyword and the occupant detector determines that the first occupant has input the first starting keyword, the one or more agent controllers provide the service with reference to a first operation history, when the one or more agent controllers start in accordance with the first starting keyword, the first operation history being operation history in which the one or more agent controllers provided the service in past when the agent controller has started with the first starting keyword, the one or more agent controllers start in accordance with a second starting keyword that is different form the first starting keyword regardless of a result of the detection of the occupant detector when the receiver receives the second starting keyword, and the one or more agent controllers provide the service with reference to a second operation history that is different form the first operation history when the one or more agent controllers start in accordance with the second starting keyword.

2. The agent device according to claim 1, wherein the agent controller is started in accordance with a starting keyword that is included in the voice and is based on a starting method set by the starting method setter.

3. The agent device according to claim 2, wherein the starting method setter excludes a specific word stored in a storage from the starting keyword.

4. The agent device according to claim 3, wherein the specific word includes part or all of a name, a surname, a full name, a nickname, and a common name of a person related to the occupant of the vehicle, which are stored in the storage.

5. The agent device according to claim 3, wherein the agent device causes the storage to store part or all of the name, surname, full name, nickname, and common name of a person related to the occupant of the vehicle as the specific word.

6. The agent device according to claim 2, wherein, when it is estimated that the set starting keyword is a word indicating a male, the agent controller provides a service including causing the output device to output the voice response on the basis of a result of the estimation.

7. The agent device according to claim 6, wherein the agent controller provides the voice response using a male tone or accent on the basis of the result of the estimation.

8. The agent device according to claim 2, wherein, when it is estimated that the set starting keyword is a word indicating a female, the agent controller provides a service including causing the output device to output the voice response on the basis of a result of the estimation.

9. The agent device according to claim 8, wherein the agent controller provides the voice response using a female tone or accent on the basis of the result of the estimation.

10. The agent device according to claim 1, wherein, the agent controller is not started in accordance with a first starting keyword when it is determined that the first starting keyword is input by an occupant different from a first occupant who has set the first starting keyword as a starting keyword via the receiver on the basis of a result of detection of the occupant detector, and starts in accordance with the first starting keyword when it is determined that the first starting keyword is input by the first occupant via the receiver on the basis of the result of the detection of the occupant detector.

11. The agent device according to claim 10, wherein the agent controller does not refer to an operation history when the agent controller has started with a starting keyword different from the first starting keyword, wherein the operation history is operation history in which the agent controller referred when the agent controller has started with the first starting keyword.

12. The agent device according to claim 1, wherein the agent controller is not started in accordance with a first starting keyword when the first starting keyword is input, and it is determined that an occupant other than a first occupant associated with the first starting keyword is present in a vehicle interior of the vehicle on the basis of a result of the detection of the occupant detector, and starts in accordance with the first starting keyword when the first starting keyword is input, and it is determined that an occupant other than the first occupant associated with the first starting keyword is not present in the vehicle interior of the vehicle on the basis of the result of the detection of the occupant detector.

13. A system which includes the agent device according to claim 1 comprising:
a plurality of agent controllers,
wherein the starting method setter uses a starting keyword common to the plurality of agent controllers.

14. A control method of an agent device comprising:
by a computer,
imaging an occupant of the vehicle;
detecting the occupant of the vehicle;
providing a service which includes causing an output device to output a voice response according to a voice of the occupant which is collected in a vehicle interior of a vehicle;
receiving an input by the occupant;
changing or adding a starting method of a function of providing the service on the basis of the received content;
acquiring an image in response to receiving a first starting keyword, the first starting keyword being a word that is set by the first occupant and for causing one or more agent controllers to start;
referring to a first reference information to determine whether a feature of the first occupant extracted from the image matches a feature associated with identification information of the first occupant in the first reference information or not, the first reference information being the feature of the first occupant extracted from an image and the identification information of the first occupant are associated with each other;

determining that the first occupant has input the first starting keyword when the feature of the first occupant extracted from the image is determined to match the feature associated with identification information of the first occupant;

determining that the first occupant has not input the first starting keyword when the feature of the first occupant extracted from the image is determined to not match the feature associated with identification information of the first occupant;

not starting the one or more agent controllers in accordance with the first starting keyword in response to receiving the first starting keyword and determining that the first occupant has not input the first starting keyword;

starting the one or more agent controllers in accordance with the first starting keyword in response to receiving the first starting keyword and determining that the first occupant has input the first starting keyword;

providing the service with reference to a first operation history, when the one or more agent controllers start in accordance with the first starting keyword, the first operation history being operation history in which the one or more agent controllers provided the service in past when the agent controller has started with the first starting keyword;

starting the one or more agent controllers in accordance with a second starting keyword that is different form the first starting keyword regardless of a result of the detection of the occupant detector when the receiver receives the second starting keyword; and providing the service with reference to a second operation history that is different form the first operation history when the one or more agent controllers start in accordance with the second starting keyword.

15. A non-transitory computer-readable storage medium that stores a computer program to be executed by a computer to perform at least:

image an occupant of the vehicle;

detect the occupant of the vehicle;

provide a service which includes causing an output device to output a voice response according to a voice of the occupant which is collected in a vehicle interior of a vehicle;

receive an input by the occupant;

change or add a starting method of a function of providing the service on the basis of the received content;

acquire an image in response to receiving a first starting keyword, the first starting keyword being a word that is set by the first occupant and for causing one or more agent controllers to start;

refer to a first reference information to determine whether a feature of the first occupant extracted from the image matches a feature associated with identification information of the first occupant in the first reference information or not, the first reference information being the feature of the first occupant extracted from an image and the identification information of the first occupant are associated with each other;

determine that the first occupant has input the first starting keyword when the feature of the first occupant extracted from the image is determined to match the feature associated with identification information of the first occupant;

determine that the first occupant has not input the first starting keyword when the feature of the first occupant extracted from the image is determined to not match the feature associated with identification information of the first occupant;

not start the one or more agent controllers in accordance with the first starting keyword in response to receiving the first starting keyword and determining that the first occupant has not input the first starting keyword;

start the one or more agent controllers in accordance with the first starting keyword in response to receiving the first starting keyword and determining that the first occupant has input the first starting keyword;

provide the service with reference to a first operation history, when the one or more agent controllers start in accordance with the first starting keyword, the first operation history being operation history in which the one or more agent controllers provided the service in past when the agent controller has started with the first starting keyword;

start the one or more agent controllers in accordance with a second starting keyword that is different form the first starting keyword regardless of a result of the detection of the occupant detector when the receiver receives the second starting keyword; and provide the service with reference to a second operation history that is different form the first operation history when the one or more agent controllers start in accordance with the second starting keyword.

* * * * *